United States Patent
Suzuki

(10) Patent No.: US 12,227,431 B2
(45) Date of Patent: Feb. 18, 2025

(54) METHOD OF MANUFACTURING POSITIVE ELECTRODE ACTIVE MATERIAL FOR LITHIUM ION SECONDARY BATTERY, POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventor: Jun Suzuki, Ehime (JP)

(73) Assignees: SUMITOMO METAL MINING CO., LTD., Tokyo (JP); Panasonic Energy Co., Ltd., Osaka (JP)

( * ) Notice: Subject to any disclaimer, the term of this patent is extended or adjusted under 35 U.S.C. 154(b) by 699 days.

(21) Appl. No.: 17/432,163

(22) PCT Filed: Feb. 18, 2020

(86) PCT No.: PCT/JP2020/006360
§ 371 (c)(1),
(2) Date: Aug. 19, 2021

(87) PCT Pub. No.: WO2020/171088
PCT Pub. Date: Aug. 27, 2020

(65) Prior Publication Data
US 2022/0135429 A1 May 5, 2022

(30) Foreign Application Priority Data
Feb. 21, 2019 (JP) .................. 2019-029870

(51) Int. Cl.
*C01G 53/00* (2006.01)
*H01M 10/0525* (2010.01)

(52) U.S. Cl.
CPC ........ *C01G 53/42* (2013.01); *H01M 10/0525* (2013.01)

(58) Field of Classification Search
CPC ..... C01G 53/42; C01G 53/50; C01P 2002/54; C01P 2004/03; C01P 2004/45;
(Continued)

(56) References Cited

U.S. PATENT DOCUMENTS

| 8,962,195 B2 | 2/2015 | Shizuka et al. |
| 2017/0207453 A1 | 7/2017 | Oda |
| 2018/0287144 A1 | 10/2018 | Furuichi et al. |

FOREIGN PATENT DOCUMENTS

| CN | 107251285 | 10/2017 |
| CN | 107623124 | 1/2018 |

(Continued)

OTHER PUBLICATIONS

English Translation of JP2017063003.*
International Search Report mailed on Apr. 28, 2020 with respect to No. PCT/JP2020/006360.

*Primary Examiner* — Kiran Quraishi Akhtar
(74) *Attorney, Agent, or Firm* — IPUSA, PLLC

(57) ABSTRACT

A method of manufacturing a positive electrode active material for a lithium ion secondary battery includes a mixing step of mixing a lithium-nickel composite oxide which is a starting material with a tungsten compound powder without lithium, while being heated, to prepare a tungsten mixture, and a heat treatment step of heat-treating the tungsten mixture. The lithium-nickel composite oxide contains lithium (Li), nickel (Ni), and an element M (M), wherein, the element M is at least one element selected from Mn, V, Mg, Mo, Nb, Ti, Co, and Al, wherein, in the starting material, a ratio of number of tungsten atoms to a total number of nickel atom and the element M atoms contained in the lithium-nickel composite oxide is 0.05 at. % or more and 3.00 at. % or less.

9 Claims, 5 Drawing Sheets

(58) Field of Classification Search
CPC .............. C01P 2004/80; C01P 2006/40; C01P 2006/82; H01M 10/0525; H01M 4/0471; H01M 4/505; H01M 4/525; H01M 2004/028; Y02E 60/10
See application file for complete search history.

(56) References Cited

FOREIGN PATENT DOCUMENTS

| | | | | |
|---|---|---|---|---|
| JP | 2005-251716 | | 9/2005 | |
| JP | 2009-289726 | | 12/2009 | |
| JP | 2010-040383 | | 2/2010 | |
| JP | 2013-125732 | | 6/2013 | |
| JP | 2013-144625 | | 7/2013 | |
| JP | 2015-227263 | | 12/2015 | |
| JP | 2017063003 | * | 3/2017 | ............. Y02E 60/10 |
| JP | 2017-152294 | | 8/2017 | |
| WO | 2016/017783 | | 2/2016 | |

\* cited by examiner

METHOD OF MANUFACTURING POSITIVE ELECTRODE ACTIVE MATERIAL FOR LITHIUM ION SECONDARY BATTERY, POSITIVE ELECTRODE ACTIVE MATERIAL FOR LITHIUM ION SECONDARY BATTERY, AND LITHIUM ION SECONDARY BATTERY

TECHNICAL FIELD

The present invention relates to a method of manufacturing a positive electrode active material for a lithium ion secondary battery, a positive electrode active material for a lithium ion secondary battery, and a lithium ion secondary battery.

BACKGROUND OF THE INVENTION

In recent years, with the spread of portable electronic devices such as cellular phones and notebook PCs, there is a strong need for the development of small, lightweight, secondary batteries with high energy density. In addition, the development of high-output secondary batteries for electric vehicles such as hybrid vehicles is strongly desired.

Lithium ion secondary batteries have been proposed as secondary batteries that satisfy such requirements. Such lithium ion secondary battery is configured by, for example, a negative electrode, a positive electrode, and an electrolyte, or the like. As active materials of the negative electrode and the positive electrode, materials that can intercalate and de-intercalate lithium ions are used.

Such lithium ion secondary batteries are currently being extensively researched and developed. Among them, lithium ion secondary batteries that use layered or spinel-type lithium-nickel composite oxide as a positive electrode material are capable of obtaining high voltages of 4V class, and thus have being practically used as batteries with high energy density.

As materials have been mainly proposed, lithium-cobalt composite oxide ($LiCoO_2$), which is relatively easy to synthesize, lithium-nickel composite oxide ($LiNiO_2$), which uses nickel that is less expensive than cobalt, lithium-nickel-cobalt-manganese composite oxide ($LiNi_{1/3}Co_{1/3}Mn_{1/3}O_2$), lithium-manganese composite oxide ($LiMn_2O_4$), which uses manganese, and the like are used.

Of these, lithium-nickel composite oxide has excellent cycle characteristics and attracting attention as a material that achieves high output with low resistance. In recent years, in regard to the positive electrode active material for lithium ion secondary batteries, it has been emphasized that the low resistance required for higher output when using lithium-nickel composite oxide as lithium ion secondary batteries is important.

As a method of realizing the above-described low resistance, addition of a different element is used, and a transition metal capable of obtaining a high valence number such as W, Mo, Nb, Ta, Re, or the like is particularly useful.

For example, Patent Document 1 proposes a lithium transition metal compound powder for a lithium secondary battery positive electrode material in which one or more elements selected from Mo, W, Nb, Ta, and Re satisfy a predetermined composition formula and contain 0.1% by mol or more and 5% by mol or less of the total mole amount of Mn, Ni, and Co in the composition formula. In addition, Patent Document 1 discloses a method of manufacturing a lithium transition metal compound powder for a positive electrode material of a lithium secondary battery including a spray-drying step of pulverizing lithium carbonate, a Ni compound, a Mn compound, a Co compound, and a metal compound containing at least one element selected from Mo, W, Nb, Ta, and Re in a liquid medium, and spray-drying the slurry uniformly dispersed therein, and a firing step of firing the resulting spray-dried product.

According to Patent Document 1, cost reduction, safety improvement, high load characteristics, and improved powder handling of the lithium transition metal compound powder for a lithium secondary battery positive electrode material are said to be compatibly achieved.

However, according to the above-described manufacturing method disclosed in Patent Document 1, the lithium transition metal compound powder is obtained by pulverizing the raw material in a liquid medium, spray-drying the slurry uniformly dispersed therein, and firing the resulting spray-dried product. Therefore, there is a problem that some of the heterogenous elements such as Mo, W, Nb, Ta, and Re are replaced with Ni which is disposed in a layer, and the battery characteristics such as the capacity and the cycle characteristics of the battery are reduced.

In addition, Patent Document 2 proposes a positive electrode active material for a non-aqueous secondary battery having at least a layered structure of a lithium transition metal composite oxide, wherein the lithium transition metal composite oxide exists in the form of particles consisting of one or both of primary particles and secondary particles that are aggregates of the primary particles, and wherein at least one type of compound is selected from the group consisting of molybdenum, vanadium, tungsten, boron, and fluorine on at least surface of the particles. In addition, Patent Document 2 discloses a method of manufacturing the positive electrode active material for a non-aqueous electrolyte secondary battery by firing and pulverizing a raw material mixture which is a mixture of a compound obtained by heat-treating after an additive element such as a molybdenum compound, a lithium compound, and a cobalt compound obtained are co-precipitated.

According to the positive electrode active material for the non-aqueous electrolyte secondary battery disclosed in Patent Document 2, the initial characteristics are improved without losing the improvement of thermal stability, load characteristics, and output characteristics, particularly by having a compound having at least one selected from the group consisting of molybdenum, vanadium, tungsten, boron, and fluorine on the surface of the particles.

However, in Patent Document 2, the effect of at least one additive element selected from the group consisting of molybdenum, vanadium, tungsten, boron, and fluorine is said to be an improvement in the initial characteristics, that is, the initial discharge capacity and the initial efficiency, and not an improvement in the output characteristics. In addition, according to the manufacturing method disclosed in Patent Document 2, since a raw material mixture is a mixture of a compound obtained by heat-treating after the additive element such as the molybdenum compound, the lithium compound, and cobalt and the like are co-precipitated, a portion of the additive element is replaced with the layer of nickel, resulting in a deterioration of the battery characteristics.

In addition, Patent Document 3 discloses a positive electrode active material which is heat-treated by coating a tungsten oxide compound to composite oxide particles having a predetermined composition, and the amount of carbonate ion is 0.15% by mass or less. In addition, Patent Document 3 discloses a method of manufacturing a positive electrode active material including a deposition step in which the tungsten oxide compound is deposited on a composite oxide particle including lithium (Li) and nickel (Ni) and a heating step in which the composite oxide particle having the tungsten oxide compound is heated.

According to Patent Document 3, a gas generation due to decomposition of a non-aqueous electrolyte solution can be suppressed. Alternatively, a gas generation from the positive electrode active material itself can be suppressed. However, the positive electrode active material did not improve the output characteristics.

In addition, improvements have also been made with regard to the higher output of lithium-nickel composite oxides.

For example, Patent Document 4 discloses a lithium metal composite oxide consisting of primary particles and secondary particles composed of aggregation of primary particles. A positive electrode active material for non-aqueous electrolyte secondary batteries having fine particles containing lithium tungstate represented by any one of $Li_2WO_4$, $Li_4WO_5$, or $Li_6W_2O_9$ on the surface of its lithium metal composite oxide has been proposed, and it is said that high output as well as high capacity can be obtained.

However, although highly output is realized while the capacity is maintained, further high capacity has been demanded.

Patent Document 5 discloses a method of manufacturing a positive electrode active material of a non-aqueous electrolyte secondary battery, including a mixing step of mixing lithium-nickel composite oxide particles, a tungsten compound powder without lithium, and water to prepare a tungsten mixture; a first heat-treatment step of heat-treating the tungsten mixture, and forming a lithium-nickel composite oxide particles in which tungsten is dispersed on the surface of primary particles by heat-treating the tungsten mixture in the heat-treatment step, and dissolving the tungsten compound particles by reacting the tungsten compound particles with the lithium compound present on the surface of primary particles of the lithium-nickel composite oxide particles; and a second heat-treatment step of forming lithium-nickel composite oxide particles with tungsten and lithium-containing compounds on the surface of the primary particles of the lithium-nickel composite oxide particles by heat treatment at a temperature higher than the first heat treatment step, which is performed next to the first heat treatment step.

PRIOR ART DOCUMENTS

Patent Document

Patent Document 1: Japanese Patent Application Laid-Open No. 2009-289726
Patent Document 2: Japanese Patent Application Laid-Open No. 2005-251716
Patent Document 3: Japanese Patent Application Laid-Open No. 2010-40383
Patent Document 4: Japanese Patent Application Laid-Open No. 2013-125732
Patent Document 5: Japanese Patent Application Laid-Open No. 2017-063003

SUMMARY OF THE INVENTION

Problems to be Solved by the Invention

In the embodiment of Patent Document 5, only an example in which a mixed powder of the tungsten mixture is placed in an aluminum bag and nitrogen gas purged in the first heat treatment step is disclosed, and when the method is applied to scaled up for mass production, the cost of production increases greatly.

In Patent Document 5, many steps such as the mixing step, the first heat treatment step, and the second heat treatment step are required. This also increases the manufacturing cost. Furthermore, the use of an aluminum bag or a vacuum dryer prevents the continuous processing of mixing and heat treatment, which is also disadvantageous in terms of cost.

In view of the problems of the above-described prior art, one aspect of the present invention is to provide a method of manufacturing a positive electrode active material for a lithium ion secondary battery capable of inexpensively producing the positive electrode active material, and capable of obtaining the positive electrode active material with high capacity and high output when used for a positive electrode of a lithium ion secondary battery.

Means for Solving the Problem

In order to solve the above problem, according to one aspect of the present invention, a method of manufacturing a positive electrode active material for a lithium ion secondary battery includes: a mixing step of mixing a lithium-nickel composite oxide which is a starting material with a tungsten compound powder without lithium, while being heated, to prepare a tungsten mixture; a heat treatment step of heat-treating the tungsten mixture, wherein the lithium-nickel composite oxide contains lithium (Li), nickel (Ni), and an element M (M), wherein, the element M is at least one element selected from Mn, V, Mg, Mo, Nb, Ti, Co, and Al, wherein, in the starting material, a ratio of number of tungsten atoms to a total number of nickel and element M atoms contained in the lithium-nickel composite oxide is 0.05 at. % or more and 3.00 at. % or less, wherein a water content, which is a proportion of the water in the starting material and the lithium-nickel composite oxide, is 3.0% by mass or more, and wherein a temperature of the mixing step is 30° C. or higher and 65° C. or lower.

Effects of the Invention

According to one aspect of the present invention, a method of manufacturing a positive electrode active material for a lithium ion secondary battery capable of inexpensively producing the positive electrode active material, and capable of obtaining the positive electrode active material of a lithium ion secondary battery with high capacity and high output when using lithium-nickel composite oxide as lithium ion secondary batteries can be provided.

DETAILED DESCRIPTION OF THE INVENTION

Figure 1:
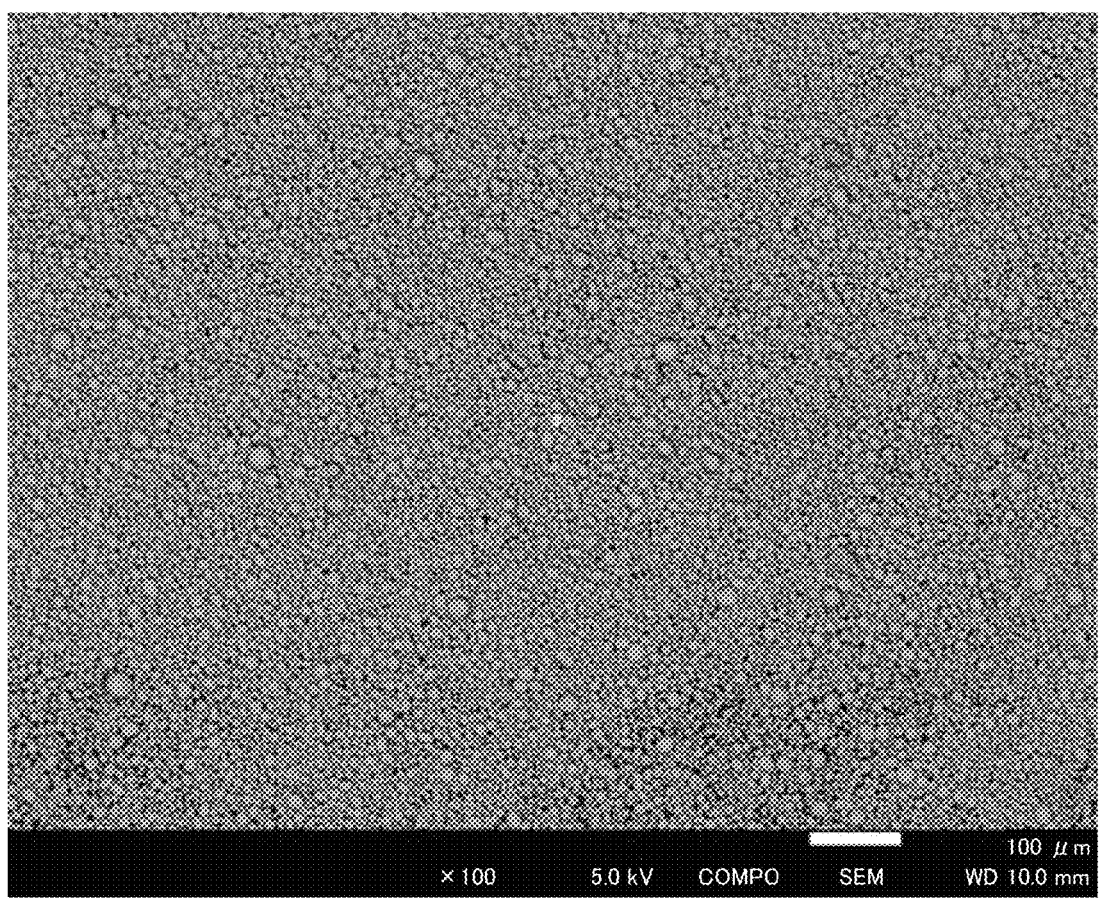
FIG. 1 is an example of an SEM image when measuring segregated particles.

While embodiments of the present invention will now be described with reference to the accompanying drawings, the present invention is not limited to the following embodiments, and various modifications and substitutions can be made to the following embodiments without departing from the scope of the present invention.

[Method of Manufacturing Positive Electrode Active Material for Lithium Ion Secondary Battery]

The method of manufacturing the positive electrode active material for a lithium ion secondary battery according to the present embodiment (hereinafter, also referred to as "method of manufacturing a positive electrode active material") can include the following steps.

A mixing step includes mixing a lithium-nickel composite oxide, which is the starting material, with a tungsten compound powder without lithium powder, while being heated, to prepare a tungsten mixture.

A heat treatment step includes heat-treating the tungsten mixture.

The lithium-nickel composite oxide can contain lithium (Li), nickel (Ni), and an element M (M). The element M is preferably at least one element selected from Mn, V, Mg, Mo, Nb, Ti, Co, and Al.

In the starting material, the ratio of the number of tungsten atoms to the total number of nickel and element M atoms is 0.05 at. % or more and 3.00 at. % or less. In addition, it is preferable that a water content, which is a proportion of the water in the starting material and the lithium-nickel composite oxide, is 3.0% by mass or more, and the temperature of the mixing step is 30° C. or higher and 65° C. or lower.

Hereinafter, each step of the method of manufacturing the positive electrode active material for a lithium ion secondary battery according to the present embodiment will be described in detail.

(Mixing Step)

In the mixing step, a lithium-nickel composite oxide, which is the starting material, and a tungsten compound without lithium (hereinafter, simply referred to as "tungsten compound") can be mixed while being heated. Though the mixing step, a tungsten mixture is obtained, which is a mixture of the lithium-nickel oxide and the tungsten compound without lithium. As described below, at least a portion of the tungsten compound reacts with excess lithium compound present on the surface of the primary particles of the lithium-nickel composite oxide in the mixing step to form a tungsten and lithium containing compound. Thus, the tungsten mixture can contain the tungsten and lithium containing compound in place of or in addition to the tungsten compound.

The starting material used in the mixing step preferably contains a water content. For example, when both the lithium-nickel composite oxide which is the starting material and the tungsten compound without lithium do not contain water content, water can be added in the mixing step. In addition, if at least one of the lithium-nickel composite oxide and the tungsten compound without lithium contains sufficient water content, water may not be added separately in the mixing step.

Because the starting material contains a water content, excess lithium compound present on the surface of primary particles of the lithium-nickel composite oxide is eluted. Therefore, when a tungsten compound that can be dissolved in a water-soluble or alkaline solution is used, the tungsten compound is dissolved and dispersed in the mixing step.

The mixing step is preferably carried out without using in a closed container, such as an aluminum pouch and the like.

The excess lithium compound present on the surface of the primary particle of the lithium-nickel composite oxide can be reacted with the tungsten compound by mixing the lithium-nickel composite oxide and the tungsten compound while being heated. Then, tungsten and lithium containing compound which is obtained by being reacted the excess lithium compound present on the surface of the primary particles of the lithium-nickel composite oxide with the tungsten compound is dissolved in water and the tungsten and lithium containing compound is dispersed on the surface of the primary particle of the lithium-nickel composite oxide.

The composition of the lithium-nickel composite oxide used in the mixing step is not particularly limited. For example, the composition of lithium (Li), nickel (Ni), and the element M (M) are preferably contained in the amount of substance ratio of Li:Ni:M=y:1−x:x (wherein 0≤x≤0.70, 0.95≤y≤1.20). The element M may be at least one element selected from Mn, V, Mg, Mo, Nb, Ti, Co, and Al. Further, the above-described y is preferably 0.97≤y≤1.15. The lithium-nickel composite oxide is preferably a compound having a layered structure, that is, a layered compound.

The lithium-nickel composite oxide can be represented, for example, by the general formula $Li_yNi_{1-x}M_xO_{2+\alpha}$. It should be noted that x, y, and the element M have already been described, the description of x, y, and the element M will be omitted here. For example, α is preferably 0.2.

The lithium-nickel composite oxide can be in the form of a powder, for example, with primary particles and secondary particles in which the primary particles are aggregated.

The lithium-nickel composite oxide used in the mixing step can be prepared by firing a mixture of nickel composite compounds such as, for example, a nickel composite oxide, a nickel composite hydroxide, and the like with a lithium compound. For example, the lithium-nickel composite oxide obtained after the firing step can be further washed with water and supplied in the mixing step as a washed cake with reduced excess lithium components or the like adhered to the surface of the lithium-nickel composite oxide particles. When the lithium-nickel composite oxide is used as a washed cake in the mixing step, the washed cake contains water. Therefore, depending on the degree of water content or the like, it may not be necessary to add water in the mixing step, as described above.

However, the lithium-nickel composite oxide used in the mixing step is preferably added in the fired state, that is, without washing with water. The fired state, that is, unwashed lithium-nickel composite oxide has sufficient amount of lithium compound particularly to react with tungsten compounds on the surface of primary particles. Therefore, by using the lithium-nickel composite oxide in the fired state, lithium extracted from the inside of the particles of the lithium-nickel composite oxide when reacting with the tungsten compound in the mixing step or the like is reduced, and thereby prevent the formation of a deteriorated layer on the surface of the primary particle of the lithium-nickel composite oxide.

The tungsten compound to be used penetrates into the surface of the primary particles inside the secondary particles of the lithium-nickel composite oxide. Therefore, the tungsten compound is preferably water soluble, and thus dissolvable in the water contained in the starting material. In addition, the tungsten compound may also be an alkaline soluble compound, because the water content in the starting material becomes alkaline with the elution of lithium. In addition, the starting material is heated in the mixing step. Therefore, even though the tungsten compound is difficult to dissolve in water at room temperature, tungsten compounds that dissolve in water when heated during the mixing step can be suitably used, or tungsten compounds react with lithium compounds on the surface of lithium-nickel composite oxide particles to form a tungsten and lithium containing compound that dissolves in water can be suitably used.

Further, there should be a sufficient amount of the dissolved tungsten compound to sufficiently penetrate to the surface of primary particles inside the secondary particles of lithium-nickel composite oxide. Therefore, for example, if the excess tungsten compound is added, some of it may be in a solid state after mixing or even heating.

Thus, the tungsten compound preferably does not contain lithium, and is preferably in a soluble state in water when heating in the mixing step. Although the tungsten compound without lithium used in the mixing step is not particularly limited, for example, one or more kinds selected from tungsten oxide, tungstic acid, ammonium tungstate, sodium tungstate, and the like are preferably used, and one or more kinds selected from tungsten oxide ($WO_3$) and tungstic acid ($WO_3 \cdot H_2O$), having a low possibility of contamination with impurities, can be more preferably used.

The amount of tungsten contained in the starting material is not particularly limited. For example, the tungsten compound is preferably added so that the number of tungsten atoms with respect to the total number of nickel and the element M atoms contained in the lithium-nickel composite oxide in the stating material is 0.05 at. % or more and 3.00 at. % or less, more preferably 0.05 at. % or more and 2.00 at. % or less, further more preferably 0.10 at. % or more and 1.00 at. % or less, and particularly preferably 0.10 at. % or more and 0.50 at. % or less.

By adding the tungsten compound so that the amount of tungsten in the starting material is within the above-described range, the amount of tungsten contained in the tungsten and lithium containing compound formed on the particle surface of the lithium-nickel composite oxide in the resulting positive electrode active material can be in the preferred range. Therefore, when the positive electrode active material is used as a material for the positive electrode of a lithium ion secondary battery, the charge-discharge capacity and the output characteristics can be particularly improved and compatible with each other.

Even after the mixing step or the heat treatment step, the ratio of the number of tungsten atoms to the total number of nickel and element M atoms contained in the product does not change. Therefore, the ratio of the tungsten atoms in the tungsten mixture obtained after the mixing step and the ratio of the tungsten atoms with respect to the total number of nickel and element M atoms in the positive electrode active material obtained after the heat treatment step preferably fall within the same range of the aforementioned starting material.

The water content, that is, the proportion of the water present in the lithium-nickel composite oxide and the starting material, is not particularly limited. However, the water content is preferably, for example, 3.0% by mass or more, more preferably 3.0% by mass or more and 7.0% by mass or less, and furthermore preferably 4.0% by mass or more and 6.0% by mass or less.

If the water content is 3.0% by mass or more, a sufficient amount of water content can be contained in the starting material, and the tungsten compound can be sufficiently dispersed on the surface of the primary particles of the lithium-nickel composite oxide. Therefore, the tungsten compound and the lithium compound on the surface of the lithium-nickel composite oxide particles can be sufficiently reacted. In addition, if the water content is 7.0% by mass or less, excessive elution of lithium from the lithium-nickel composite oxide can be prevented.

In the mixing step, it is preferable to mix while heating in order to react the excess lithium compound present on the surface of primary particles of the lithium-nickel composite oxide with the tungsten compound. It should be noted that mixing while heating also allows the tungsten compound or the tungsten and lithium containing compound to be well dispersed on the surface of primary particles of the lithium-nickel composite oxide.

The heating temperature in the mixing step, that is, the mixing temperature, is not particularly limited. For example, the mixing temperature in the mixing step is preferably 30° C. or higher and 65° C. or lower, more preferably 45° C. or higher and 60° C. or lower, and further preferably 50° C. or higher and 60° C. or lower.

The temperature of the tungsten mixture may increase slightly due to the reaction between the tungsten compound and the lithium compound present on the surface of the lithium-nickel composite oxide particles during mixing. However, when the mixing temperature is set to 65° C. or lower, the tungsten compound can be uniformly dispersed in the lithium-nickel composite oxide particles while suppressing the decrease in water content in the tungsten mixture during the mixing step. In addition, by uniformly dispersing the tungsten compound, the excess lithium compound present on the surface of the primary particles of lithium-nickel composite oxide can be sufficiently reacted with the tungsten compound. However, if the mixing temperature is above 65° C., drying of the tungsten mixture may occur, and result in insufficient water content to promote the reaction between the lithium compound and the tungsten compound.

When the mixing temperature is 30° C. or higher, the dispersion of the tungsten compound can be especially promoted, and the reaction of the tungsten compound with the excess lithium compound can also be especially promoted.

The period of the mixing step is not particularly limited, and the period of the mixing step can be arbitrarily selected depending on the mixing temperature and the like. The period of the mixing step, that is, the mixing time, is preferably 15 minutes or longer and 60 minutes or less, and more preferably 25 minutes or longer and 45 minutes or less. When the mixing time is 15 minutes or longer, the dispersion of tungsten compound and the reaction of tungsten compound with excess lithium compound can particularly promoted. In addition, from the viewpoint of increasing productivity and reducing costs, the mixing time should be 60 minutes or less, because even if the mixing time is excessively long, there is no significant difference in the degree of dispersion of the tungsten compound or in the degree of reaction between the tungsten compound and the excess lithium compound.

The atmosphere of the mixing step is not particularly limited, but in order to avoid reaction between carbon dioxide in the atmosphere and the lithium component on the surface of the lithium-nickel composite oxide particles, the atmosphere of the mixing step is preferably either decarboxylated air or an inert gas. Decarboxylated air indicates an atmosphere in which the carbonic acid in the air, that is, carbon dioxide has been decreased. Inert gas indicates an atmosphere with one or more gases selected from noble gas and nitrogen gas.

In addition, atmosphere gas in the mixing step should be exhausted in order to discharge the water content from the lithium-nickel composite oxide. Although the speed of exhaust is not particularly limited, it is preferable to exhaust the atmosphere gas of the mixing atmosphere at a rate of 0.15 m³/min or more and 0.30 m³/min or less with respect to a rate of inputting the lithium-nickel composite oxide of 1 kg/minute (feeding rate). When the atmosphere gas of mixing step is exhausted, decarboxylated air or an inert gas is supplied so that the atmosphere of mixing step does not become negative pressure. In other words, the flow rate of decarboxylated air or inert gas is preferably adjusted. When the atmosphere of mixing step becomes negative pressure, there is a risk of reacting the lithium component with carbon dioxide due to the inflow of air into the atmosphere of the mixing step. In contrast, as described above, by controlling the atmosphere of the mixing step so as not to cause negative pressure, the reaction between the lithium component and carbon dioxide is suppressed, and the property of the resulting positive electrode active material finally produced can be particularly prevented from deteriorating.

A general mixer may be used for mixing the lithium-nickel composite oxide with the tungsten compound without lithium. For example, a shaker mixer, a Loedige mixer, a Julia mixer, a V-blender, or the like may be used to sufficiently mix to the extent that the form of the lithium-nickel composite oxide is not destroyed.

(Heat Treatment Step)

In the heat treatment step, the tungsten mixture can be heat-treated. In the heat treatment step, the water content in the tungsten mixture can be sufficiently evaporated to fix or immobilize the tungsten and lithium containing compound on the surface of the primary particles of the lithium-nickel composite oxide particles.

Although the heat treatment temperature in the heat treatment step is not particularly limited, the temperature is preferably 100° C. or higher and 200° C. or lower. This is because the water content in the tungsten mixture can be sufficiently evaporated, and the compounds containing tungsten and lithium can be adequately fixed onto the particle surface of the lithium-nickel composite oxide by setting the heat treatment temperature to 100° C. or higher.

In addition, by setting the heat treatment temperature at 200° C. or lower, it is possible to prevent the formation of necking between particles of lithium-nickel composite oxide through compounds containing tungsten and lithium, and the reduction of the specific surface area of lithium-nickel composite oxide particles. Therefore, when the obtained positive electrode active material is used as a material for the positive electrode of the lithium ion secondary battery, the battery characteristics can be particularly enhanced.

The heat treatment time of the heat treatment step is not particularly limited, but the time of the heat treatment step is preferably 1 hour or longer and 5 hours or less in order to sufficiently evaporate the water content to fix the compounds containing tungsten and lithium.

The atmosphere in the heat treatment step is preferably either decarboxylated air or an inert gas in order to avoid the reaction of carbon dioxide in the atmosphere with lithium on the particle surface of the lithium-nickel composite oxide.

According to the method of manufacturing the positive electrode active material of the above-described embodiment, the tungsten compound can be uniformly dispersed in the particles of lithium-nickel composite oxide by mixing while heating in the mixing step. In addition, the excess lithium compound present on the surface of the lithium-nickel composite oxide particles is reacted with the tungsten compound to form a tungsten and lithium containing compound, and can be uniformly dispersed. Then, by sufficiently evaporating the water content in the heat treatment step, the tungsten and lithium containing compound on the surface of the lithium-nickel composite oxide particles, such as lithium tungstate, can be uniformly fixed. Therefore, the proportion of segregated particles in which the tungsten and lithium containing compound is largely deposited than other particles on the surface of lithium-nickel composite oxide particles can be suppressed. By suppressing the proportion of segregated particles, the cycle characteristics can be improved and the positive electrode resistance can be suppressed.

In addition, by setting the amount of tungsten in the tungsten mixture formed in the mixing step to a predetermined range, the amount of tungsten contained in the tungsten and lithium containing compound formed on the surface of particles of the lithium-nickel composite oxide in the obtained positive electrode active material can be in a preferred range. Therefore, when the positive electrode active material obtained by the method of manufacturing the positive electrode active material of the present embodiment is used as a material of the positive electrode of the lithium ion secondary battery, the charge-discharge capacity and the output characteristics can be particularly improved and can be achieved at the same time. That is, high output with high capacity can be obtained.

Further, according to the method of manufacturing the positive electrode active material of the present embodiment, the desired positive electrode active material can be manufactured through the aforementioned mixing step and the heat treatment step without the need to seal the material in an aluminum container or the like. Therefore, a high capacity and a high output positive electrode active material, as described above, at a low cost can be obtained.

[Positive Electrode Active Material for Lithium Ion Secondary Battery]

Next, a configuration example of the positive electrode active material for a lithium ion secondary battery of the present embodiment (hereinafter, also referred to as "positive electrode active material") will be described. It should be noted that the positive electrode active material for the lithium ion secondary battery of the present embodiment can be manufactured by, for example, the aforementioned manufacturing method of the positive electrode active material, accordingly redundant description of some matters will be omitted.

The positive electrode active material for a lithium ion secondary battery of the present embodiment can include a plurality of composite particles having particles of lithium-nickel composite oxide containing lithium (Li), nickel (Ni), and an element M (M) in an amount of substance ratio of Li:Ni:M=y:1−x:x, and a tungsten and lithium containing compound disposed on the surface of such lithium-nickel composite oxide particles.

The above-described x and y satisfy the requirements of $0 \leq x \leq 0.70$ and $0.95 \leq y \leq 1.20$, and the element M can be at least one element selected from Mn, V, Mg, Mo, Nb, Ti, Co, and Al. The above-described y is more preferably $0.97 \leq y \leq 1.15$.

In addition, a proportion of segregated particles, in which the tungsten and lithium containing compound is disposed in a greater amount than the other composite particles on the surface of the lithium-nickel composite oxide particles among a plurality of the composite particles, is 0.1% or less by number ratio. Further, the number ratio of tungsten contained in the tungsten and lithium containing compound with respect to the total number of nickel and element M atoms contained in the lithium-nickel composite oxide is preferably 0.05 at. % or more and 3.0 at. % or less.

The positive electrode active material of the present embodiment can have a plurality of composite particles having particles of the lithium-nickel composite oxide described above and a tungsten and lithium containing compound disposed on the surface of such lithium-nickel composite oxide particles. The positive electrode active material of the present embodiment may be composed of the above-described composite particles.

The lithium-nickel composite oxide can be represented, for example, by the general formula $Li_yNi_{1-x}M_xO_{2+\alpha}$. The explanation of x, y, and element M has already been described, and the description thereof is omitted here. For example, $\alpha$ is preferably $-0.2 \leq \alpha \leq 0.2$. The lithium-nickel composite oxide can have, for example, a layered structure. That is, the lithium-nickel composite oxide can be a layered compound.

In addition, the particles of the lithium-nickel oxide composite may form primary particles and secondary particles in which the primary particles are aggregated.

A high charge-discharge capacity can be obtained by using such lithium-nickel composite oxide.

It is capable of having a structure in which a tungsten and lithium containing compound, for example, lithium tungstate, is disposed on the particle surface of the lithium-nickel composite oxide as described above.

In general, if the surface of the positive electrode active material is completely coated with heterogeneous compounds, the benefit such as high capacity of the lithium-nickel composite oxide may possibly be eliminated as a result of the significant limitation of lithium ion migration (intercalation). However, in the positive electrode active material of the present embodiment, a tungsten and lithium containing compound is formed on the surface of the particles of the lithium-nickel composite oxide, but the tungsten and lithium containing compound has excellent lithium ion conductivity and promotes lithium ion migration. Therefore, by disposing the tungsten and lithium containing compound on the surface of the particles of the lithium-nickel composite oxide, the conductive path of lithium can be formed at the interface with the electrolyte, and the reaction resistance of the positive electrode active material (hereinafter, sometimes referred to as "positive electrode resistance") can be reduced, thereby improving the output characteristics.

That is, a reduction in the positive electrode resistance reduces the voltage lost in the battery, and the voltage applied to the load side becomes relatively high, resulting in a higher output. In addition, as the applied voltage to the load side increases, intercalation and de-intercalation of lithium is sufficiently performed at the positive electrode, thus improving the battery capacity. Furthermore, the cycle characteristics can be improved by reducing the reaction resistance, which also reduces the load of active material during charging and discharging.

By containing tungsten and lithium, such tungsten and lithium containing compound exerts excellent lithium ion conductivity and has the effect of promoting lithium ion migration. The specific composition of the compound is not particularly limited. However, the compound is preferably a lithium tungstate, for example, in terms of the ratio of the number of atoms, 50% or more of the tungsten contained in the tungsten and lithium containing compound is preferably present in the form of $Li_4WO_5$.

This is because $Li_4WO_5$ has more conductive paths of lithium ions than other compounds containing tungsten and lithium and is highly effective in promoting the migration of lithium ions. Thus, 50% or more of W atoms is present in the form of $Li_4WO_5$, the reduction effect in a higher reaction resistance can be obtained.

Here, the tungsten and lithium containing compound is more preferably formed on the surface of primary particles of the lithium-nickel composite oxide because contact between the electrolyte and the lithium-nickel composite oxide occurs on the surface of primary particles of the lithium-nickel composite oxide.

The surface of the primary particles of the lithium-nickel composite oxide in the present embodiment includes the surface of the primary particles exposed at the outer surface of the secondary particle of the lithium-nickel composite oxide, and the surface of the primary particles exposed at near the surface and at internal voids of the secondary particles in which the electrolytes can permeate via outside of the secondary particles. Furthermore, even at the grain boundaries between the primary particles, if the binding of the primary particles is imperfect and the electrolyte is permeable, the surface is included as the primary particles.

That is, contact between the lithium-nickel composite oxide and the electrolyte occurs not only on the outer surface of the secondary particles formed by aggregation of the primary particles of the lithium-nickel composite oxide, but also at near surface and inner voids of the secondary particles, and also occurs at imperfect grain boundaries. Therefore, it is preferable to promote the migration of lithium ions by forming and disposing the compounds containing tungsten and lithium on the surface of the primary particles.

Therefore, the reaction resistance of lithium-nickel composite oxide particles can be further reduced by forming compounds containing tungsten and lithium on many of the surfaces of the primary particle of the lithium-nickel composite oxide that can come into contact with the electrolyte.

Here, the compounds containing tungsten and lithium do not have to be completely formed on all surfaces of the primary particles that can be in contact with the electrolyte, but can be partially covered or scattered. Even if the compounds containing tungsten and lithium are partially coated or scattered, if the compounds containing tungsten and lithium are formed on the surface of the primary particles that can come into contact with the electrolyte, the effect of reducing positive electrode resistance can be obtained.

It is preferable that the particles of lithium-nickel composite oxide contained in the positive electrode active material of the present embodiment are uniformly formed with the compounds containing tungsten and lithium on the surface of the primary particles.

Here, the positive electrode active material includes a plurality of composite particles having particles of a lithium-nickel composite oxide and a tungsten and lithium containing compound disposed on the surface of the particles of the lithium-nickel composite oxide. It should be noted that the particles of the lithium-nickel composite oxide can include primary particles including the lithium-nickel composite oxide or secondary particles in which the primary particles are aggregated.

If compounds containing tungsten and lithium are not formed evenly on the surface of the particles of the lithium-nickel composite oxide between the above-described composite particles, the migration of lithium ions between the composite particles becomes uneven, and a load is imposed on specific composite particles, which may lead to deterioration of the cycle characteristics and an increase in the positive electrode resistance in the long term.

When the positive electrode active material of the present embodiment contains segregated particles and the positive electrode active material is observed under a scanning electron microscope (SEM), the other composite particles are gray, while the segregated particles are white. The segregated particle refers to a particle on which a tungsten and lithium containing compound is deposited and disposed more than other composite particles on the particle surface of the lithium-nickel composite oxide.

Therefore, the presence or absence of segregated particles, the number ratio of segregated particles, and the like can be calculated by observing the positive electrode active material of the present embodiment with a scanning electron microscope.

In addition, in the positive electrode active material of the present embodiment, as described above, the proportion of segregated particles, in which a tungsten and lithium containing compound is disposed on the surface of the particles of the lithium-nickel composite oxide more than other composite particles, is preferably 0.1% or less and more preferably 0.01% or less.
If the proportion of segregated particles among a plurality of composite particles is 0.1% or less, the cycle characteristics can be increased and the positive electrode resistance can be suppressed.

Among a plurality of composite particles, the lower limit value of the proportion of the segregated particles is not particularly limited, but segregated particles are preferably absent. Therefore, the lower limit is preferable 0% or more.

The method of calculating the proportion of the segregated particles among the plurality of composite particles of the positive electrode active material of the present embodiment is not particularly limited. However, for example, the proportion of the segregated particles among the composite particles in the obtained plurality of fields can be calculated by observing the positive electrode active material at a magnification of 10 times or more and 1000 times or less, at 3 to 20 field of view, for example, by using a scanning electron microscope. The observation conditions of the scanning electron microscope are not particularly limited, but for example, the acceleration voltage is preferably 1 kV or more and 20 kV or less.

The evenness of the compounds containing tungsten and lithium in the resulting composite particles can also be evaluated and confirmed, for example, by variations in tungsten content when the composite particles are sampled from the positive electrode active material several times to analyze the tungsten content.

In addition, the ratio of the number of tungsten atoms contained in the tungsten and lithium containing compound (hereinafter, also referred to as the "amount of tungsten") to the total number of nickel and element M atoms contained in the lithium-nickel composite oxide is preferably 0.05 at. % or more and 3.00 at. % or less, more preferably 0.05 at. % or more and 2.00 at. % or less, further preferably 0.10 at. % or more and 1.00 at. % or less, and particularly preferably 0.10 at. % or more and 0.50 at. % or less. When the amount of tungsten in the above-described range is used, both a high charge-discharge capacity and an output characteristic can be obtained when the positive electrode active material is used as the positive electrode material of a lithium ion secondary battery.

In the positive electrode active material of the present embodiment, for example, tungsten is derived from the tungsten and lithium containing compound disposed on the surface of the lithium-nickel composite oxide particles, and nickel and the element M are derived from the lithium-nickel composite oxide. Thus, with respect to the amount of tungsten described above, in other words, the ratio of the number of tungsten atoms to the total number of nickel and element M atoms contained in the positive electrode active material of the present embodiment is preferably 0.05 at. % or more and 3.00 at. % or less, as described above.

The amount of aforementioned tungsten is preferably 0.05 at. % or more, thereby the output characteristics can be particularly increased.

In addition, the generation of the segregated particles can be particularly suppressed when the amount of tungsten described above is 3.00 at. % or less. When the amount of tungsten is 3.00 at. % or less, the lithium conductivity between the lithium-nickel composite oxide and the electrolyte can be increased and the charge-discharge capacity can be increased.

The form of the tungsten and lithium containing compound disposed on the surface of lithium-nickel composite oxide particles is not particularly limited. However, if the surface of the particles of the lithium-nickel composite oxide is covered with a layered material, which is a thick film of a tungsten and lithium containing compound, a thick film of the particle boundary of the lithium-nickel composite oxide is filled, and a decrease in specific surface area may occur. In addition, when a thick, layered material is formed of a tungsten and lithium containing compound, such tungsten and lithium containing compound may be concentrated on the particle surface of a particular lithium-nickel composite oxide, and the thick layered material may not be formed on the particle surface of many other lithium-nickel composite oxide. Therefore, the contact area between the lithium-nickel composite oxide and the electrolyte via the tungsten and lithium containing compound may be reduced.

Accordingly, in order to obtain much higher effects, the tungsten and lithium containing compound is preferably present on the surface of particles of the lithium-nickel composite oxide as particles with a particle size of 1 nm or more and 300 nm or less.

When the particle size of the tungsten and lithium containing compound is set to 1 nm or more, particularly sufficient lithium ion conductivity can be exerted. Further, when the particle size of the tungsten and lithium containing compound is set to 300 nm or less, particles of the tungsten and lithium containing compound can be particularly uniformly formed on the surface of the particles of the lithium-nickel composite oxide, and the reaction resistance can be particularly reduced.

When the form described above is adapted, particles of the tungsten and lithium containing compound can effectively enhance lithium ion conductivity with sufficient contact area with the electrolyte. Therefore, particularly high charge and discharge capacitance can be improved, and more effective reduction of reaction resistance can be achieved.

However, particles of the tungsten and lithium containing compound do not need to all exist as particle size of 1 nm or more and 300 nm or less. For example, it is preferable that 50% or more of the particles of the tungsten and lithium containing compound formed on the particle surface of lithium-nickel composite oxide satisfy the above-described range from the viewpoint of obtaining a particularly high effect.

In contrast, when a thin film of a tungsten and lithium containing compound is coated on the particle surface of a lithium-nickel composite oxide, the conductive path of Li can be formed at the interface with the electrolyte while suppressing the decrease of the specific surface area. Accordingly, the effects such as improving the charging-discharging capacity and reducing the reaction resistance can be obtained. When the surface of primary particles is coated with such a thin film of tungsten and lithium containing compound, the tungsten and lithium containing compound is preferably present on the surface of the primary particles of the lithium-nickel composite oxide as a coating having a film thickness of 1 nm or more and 200 nm or less.

When the thickness of the thin film of the tungsten and lithium containing compound is set to 1 nm or more, the thin film can have particularly sufficient lithium ion conductivity. In addition, when the thickness of the thin film of the tungsten and lithium containing compound is set to 200 nm or less, the conductivity of lithium ion can be particularly increased and the reaction resistance can be particularly reduced.

The thin film of tungsten and lithium containing compound does not need to be formed throughout the particles of the lithium-nickel composite oxide. For example, the thin film may be partially formed on the surface of the particles of the lithium-nickel composite oxide, and the range of film thickness of all films may not be 1 nm or more and 200 nm or less. If the thin film of the tungsten and lithium containing compound having a film thickness of at least partially 1 nm or more and 200 nm or less is formed on the surface of the primary particles, the aforementioned high effects can be obtained. For example, when a tungsten and lithium containing compound is formed as a coating, by controlling the amount of tungsten contained in the compound to the above-described range, a coating having a thickness of 1 nm or more and 200 nm or less in which the thickness is sufficient to obtain an effect can be formed.

In addition, even when a tungsten and lithium containing compound is formed on the particle surface of the lithium-nickel composite oxide in which the form of particle and the form of thin film are mixed, a high effect on the battery characteristics can be obtained.

In addition, although the total amount of lithium in the positive electrode active material is not particularly limited, the ratio "Li/Me ratio" of the number of lithium (Li) atom to the total number of atoms (Me) of nickel and the element M in the positive electrode active material is preferably 0.95 or more and 1.20 or less, and more preferably 0.97 or more and 1.15 or less.

By setting the ratio of the Li/Me to 0.95 or more, when the obtained positive electrode active material is used as a material for the positive electrode of a lithium ion secondary battery, the reaction resistance of the positive electrode is particularly suppressed, thereby increasing the output of the battery. In addition, when the ratio of Li/Me is set to 1.20 or less, the excess lithium component on the particle surface of the lithium-nickel composite oxide can be suppressed. Therefore, when the positive electrode active material is used as a material for the positive electrode of the lithium ion secondary battery, the initial discharge capacity can be particularly increased, and the reaction resistance of the positive electrode can be suppressed.

The lithium content contained in the tungsten and lithium containing compound is supplied from the lithium-nickel composite oxide as a base material, the total amount of lithium in the positive electrode active material does not change before and after the formation of the tungsten and lithium containing compound.

That is, after the formation of the tungsten and lithium containing compound, the ratio of Li/Me of the lithium-nickel composite oxide particles as the base material (core material) is reduced compared to before the formation. Therefore, by setting the ratio of Li/Me to 0.97 or more, a better charge-discharge capacity and a reaction resistance can be obtained.

Accordingly, the ratio of Li/Me of the entire positive electrode active material is preferably 0.97 or more and 1.15 or less.

The positive electrode active material of the present embodiment provides a tungsten and lithium containing compound on the surface of the secondary particles and the surface of the primary particles of the lithium-nickel composite oxide particles to improve the output characteristics and the cycle characteristics. The powder characteristics, such as the particle size and the tap density, as the positive electrode active material are not particularly limited. For example, the powder characteristics may be within the range of the normally used positive electrode active material.

In addition, the effects of providing a tungsten and lithium containing compound on the surface of the secondary particles and the surface of the primary particles of the lithium-nickel composite oxide are applicable to powders such as, for example, a lithium-cobalt-based composite oxide, a lithium-manganese-based composite oxide, a lithium-nickel-cobalt-manganese-based composite oxide, and the like. Furthermore, the effects can also applicable to not only the positive electrode active material disclosed in the present invention but also the positive electrode active material for lithium secondary batteries commonly used.

[Li Ion Secondary Battery]

A lithium ion secondary battery in accordance with the present embodiment (hereinafter referred to as "secondary battery") can have a positive electrode that includes the aforementioned positive electrode active material.

Hereinafter, an example of a secondary battery according to the present embodiment will be described for each component. The secondary battery in the present embodiment includes, for example, a positive electrode, a negative electrode, and a non-aqueous electrolyte, and is configured by the same components as a general lithium ion secondary battery. It should be noted that the embodiments described below are merely exemplary, and the lithium ion secondary battery of the present embodiment can be implemented in various modified and improved forms based on the knowledge of a person skilled in the art, including the following embodiments. In addition, the secondary battery is not particularly limited with respect to uses thereof.

(Positive Electrode)

The positive electrode of the secondary battery in the present embodiment can include the positive electrode active material described above.

An example of a manufacturing method of the positive electrode will be described below. First, the aforementioned positive electrode active material (in powder form), a conductive material, and a binding agent (binder) can be mixed to form a positive electrode mixture. If necessary, activated carbon or a solvent for adjusting the viscosity can be added to the positive electrode mixture, and followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of conventional lithium-ion secondary batteries. For example, if the total mass of solids of the positive electrode mixture without solvent is 100% by mass, the positive electrode active material may be present in an amount of 60% by mass or more and 95% by mass or less, the conductive material may be present in an amount of contain 1% by mass or more and 20% by mass or less, and the binder may be present in an amount of 1% by mass or more and 20% by mass or less.

The resulting positive electrode mixture paste is coated, for example, on the surface of an aluminum foil current collector, dried to evaporate solvent to prepare a sheet-like positive electrode is prepared. If necessary, pressure may be applied by roll press or the like to increase electrode density. The sheet-like positive electrode obtained in this way can be cut to a suitable size to suit the battery in which the electrode is to be used. Accordingly, the sheet-like positive electrode can be used for producing a battery.

As the conductive material, for example, graphite (natural graphite, artificial graphite, expanded graphite, and the like) or carbon black-based material such as acetylene black or Ketchen Black (Registered Trademark), or the like can be used.

The binder serves to anchor the active material particles. One or more of binders selected from polyvinylidene fluoride (PVDF), polytetrafluoroethylene (PTFE), fluorine rubber, ethylene propylene diene rubber, styrene butadiene, cellulose-based resins, polyacrylic acid, or the like can be used.

If necessary, a solvent to disperse the positive electrode active material and the conductive material, and a solvent to dissolve the binding agent may be added to the positive electrode mixture. For example, an organic solvent such as N-methyl-2-pyrrolidone may be used as the solvent. An activated carbon can also be added to the positive electrode mixture to increase the electrical double layer capacity.

The method of manufacturing positive electrode is not limited to the example described above. Instead, the positive electrode may be manufactured by other methods. For example, the positive electrode mixture may be press molded and then dried under vacuum.

(Negative Electrode)

The negative electrode may be a lithium metal, a lithium alloy, or the like. The negative electrode may be formed by mixing a negative electrode active material capable of intercalating and de-intercalating lithium ions with a binder agent, and further adding an appropriate solvent to the mixture so as to form a paste-like negative electrode mixture, then, the paste-like negative electrode mixture is coated to the surface of a metal foil current collector such as copper, and the resultant is subjected to be dried. The negative electrode may be compressed to increase the electrode density as needed.

As for the negative electrode active material, for example, an organic compound fired body such as natural graphite, artificial graphite, phenolic resins, and the like; and powders of carbon materials such as coke and the like can be used. In this case, a fluorine-containing resin such as PVDF may be used as the negative electrode binder in the same manner as the positive electrode. An organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. A conventional separator can be used, for example, the separator may be a thin-film, such as polyethylene or polypropylene having a number of microscopic pores.

(Non-Aqueous Electrolyte)

Examples of non-aqueous electrolyte include a non-aqueous electrolytic solution.

As the non-aqueous electrolytic solution, for example, a solution in which a lithium salt as a supporting salt is dissolved in an organic solvent, may be used. As the non-aqueous electrolytic solution, the solution prepared by dissolving a lithium salt in an ionic liquid, may be used. The ionic liquid is a salt that includes cations and anions other than lithium ions and is a liquid at room temperature.

The organic solvent may be a solvent selected from the group consisting of cyclic carbonates such as ethylene carbonate, propylene carbonate, butylene carbonate, trifluoropropylene carbonate, and the like; a chain-like carbonate such as diethyl carbonate, dimethyl carbonate, ethyl methyl carbonate, dipropyl carbonate, and the like; an ether compound such as tetrahydrofuran, 2-methyl tetrahydrofuran, dimethoxyethane, and the like; a sulfur compound such as ethyl methyl sulfone, butanesultone, and the like; a phosphorus compound such as triethyl phosphate, trioctyl phosphate, and the like; may be used alone. The organic solvent used may also be a mixture of two or more organic solvents.

As the supporting salt, $LiPF_6$, $LiBF_4$, $LiClO_4$, $LiAsF_6$, $LiN(CF_3SO_2)_2$, and their composite salts may be used. In addition, the non-aqueous electrolytic solution may contain radical scavengers, surfactants, flame retardants, and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolyte include an oxide-based solid electrolyte, a sulfide-based solid electrolyte, and the like.

The oxide-based solid electrolyte is not particularly limited. For example, the oxide-based solid electrolyte may preferably contain oxygen (O) and may preferably exhibit a lithium ion conductivity and an electron insulating property. The oxide-based solid electrolyte is one or more compounds selected from lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ ($0 \leq X \leq 1$), $Li_{1+x}Al_xGe_{2-x}(PO_4)_3$, ($0 \leq X \leq 1$), $LiTi_2(PO_4)_3$, $Li_{3x}La_{2/3-x}TiO_3$ ($0 \leq X \leq 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. For example, the sulfide-based solid electrolyte is one or more kinds selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$, and the like.

An inorganic solid electrolyte other than the above may be used. For example, $Li_3N$, $LiI$, $Li_3N$—$LiI$—$LiOH$, or the like may be used.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

(Shape and Configuration of the Secondary Battery)

The lithium ion secondary battery of the present embodiment described above can be in a variety of shapes, such as cylindrical or laminated shape. In any form, when the secondary battery according to the present embodiment uses a non-aqueous electrolytic solution as a non-aqueous electrolyte, the positive electrode and the negative electrode can be laminated via a separator to form an electrode body. The obtained electrode body is impregnated with the non-aqueous electrolytic solution. Then, between the positive electrode collector and the positive electrode terminal leading to the outside and between the negative electrode collector and the negative electrode terminal leading to the outside is connected with a collector lead or the like, and sealed in a battery case.

As described above, the secondary battery according to the present embodiment is not limited to an embodiment using a non-aqueous electrolytic solution as a non-aqueous electrolyte. The secondary batter of the present embodiment may be, for example, a secondary battery using a solid non-aqueous electrolyte, that is, an all-solid-state battery. In the case of all-solid-state battery, the configuration other than the positive electrode active material can be changed as necessary.

In the secondary battery of the present embodiment, the battery has high capacity and high output because the above-mentioned positive electrode active material is used as the material of the positive electrode.

In particular, when the aforementioned positive electrode active material is used for a lithium ion secondary battery, the secondary battery exhibits high initial discharge capacity of 210 mAh/g, that is, high capacity and low positive electrode resistance can be obtained, and further exhibits high output, depending on the composition, for example, when the secondary battery is used for the positive electrode of a 2032-type coin battery. In addition, it can also be said that the secondary battery exhibits high thermal stability and excellent safety.

In addition, the secondary battery of the present embodiment can be used for various applications. Because the secondary battery of the present embodiment can be high capacity and high output, the secondary battery of the present embodiment is suitable, for example, for power supply for compact portable electronic devices (such as notebook personal computers and mobile phone terminals) that require high capacity at all times, and for power supply for electric vehicles that require high output.

In addition, the secondary battery of the present embodiment can be miniaturized and has high output. Therefore, the secondary battery of the present embodiment is suitable as a power supply for an electric vehicle that is constrained by the mounting space. The secondary battery according to the present embodiment can be used not only as a power supply for an electric vehicle driven by purely electrical energy, but also as a power supply for a hybrid vehicle in combination with a combustion engine such as a gasoline engine or a diesel engine.

EXAMPLES

Although the present invention will be described in further detail in the following examples and comparative examples, the present invention is not limited in any way by these examples. Various evaluation methods for the positive electrode active material and the battery in Examples and Comparative Examples are as follows.

(Evaluation of Positive Electrode Active Material)
(a) Proportion of Segregated Particles In order to calculate the proportion of segregated particles contained in the composite particles in the positive electrode active material, a scanning electron microscope was used to image any 10 locations of powders of the positive electrode active material at an applied voltage of 5 kV and a magnification of 100 times. In other words, observations were made in 10 fields. At this time, a scanning electron micrograph, such as that indicated in FIG. 1, is obtained in one field of view. Then, the number of segregated particles, which are white particles indicated in the 10 SEM photographs, was counted, and the proportion of the segregated particles out of the composite particles included in the 10 SEM photographs was measured.

Figure 2:
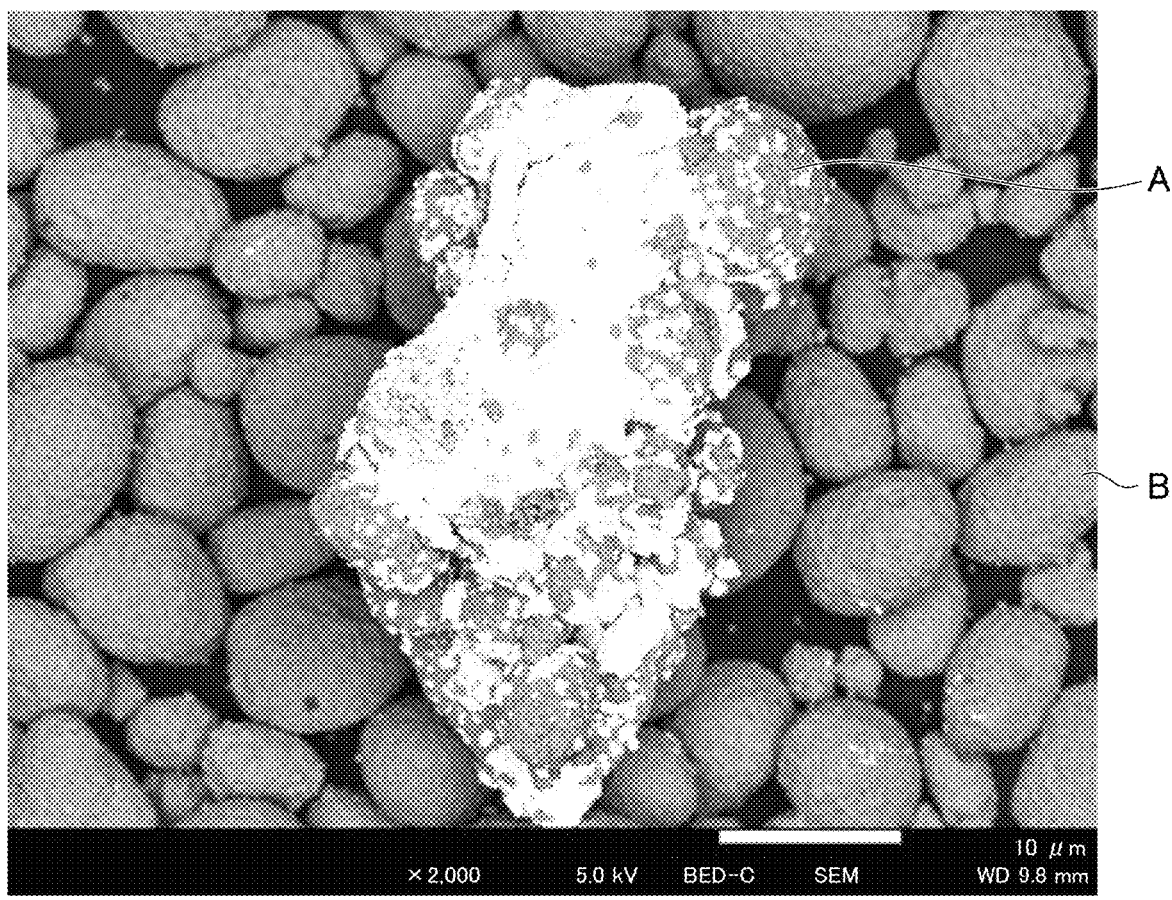
FIG. 2 is an SEM photograph of a segregated particle.
Figure 3:
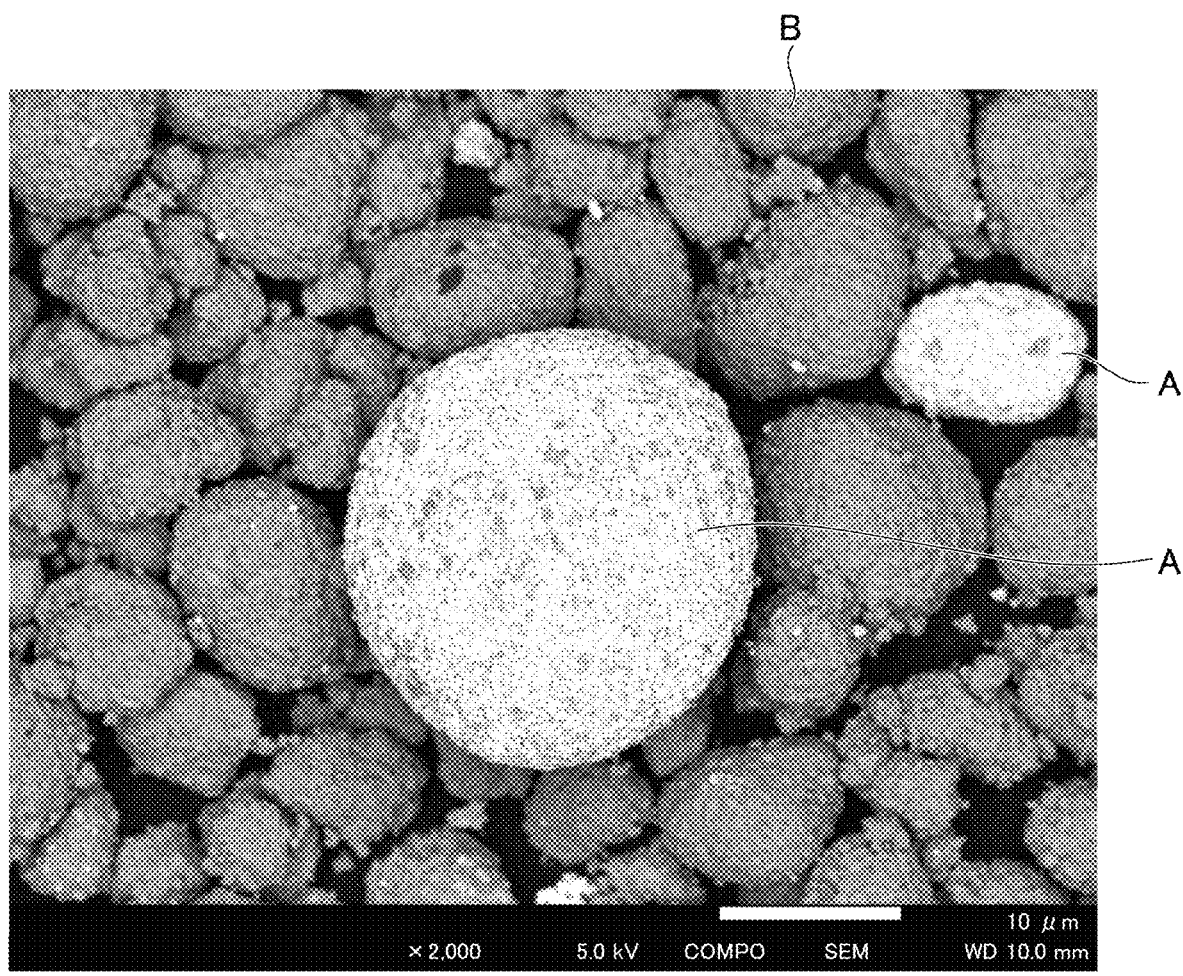
FIG. 3 is an SEM photograph of segregated particles.

As illustrated in FIGS. 2 and 3, segregated particles A can be observed as white particles, while the other composite particles B can be observed as gray particles.

(Manufacture and Evaluation of Battery)
(a) Manufacturing of Battery

For the evaluation of the positive electrode active material, a 2032-type coin battery 11 (hereinafter referred to as "coin battery") illustrated in FIG. 4 was used.

Figure 4:
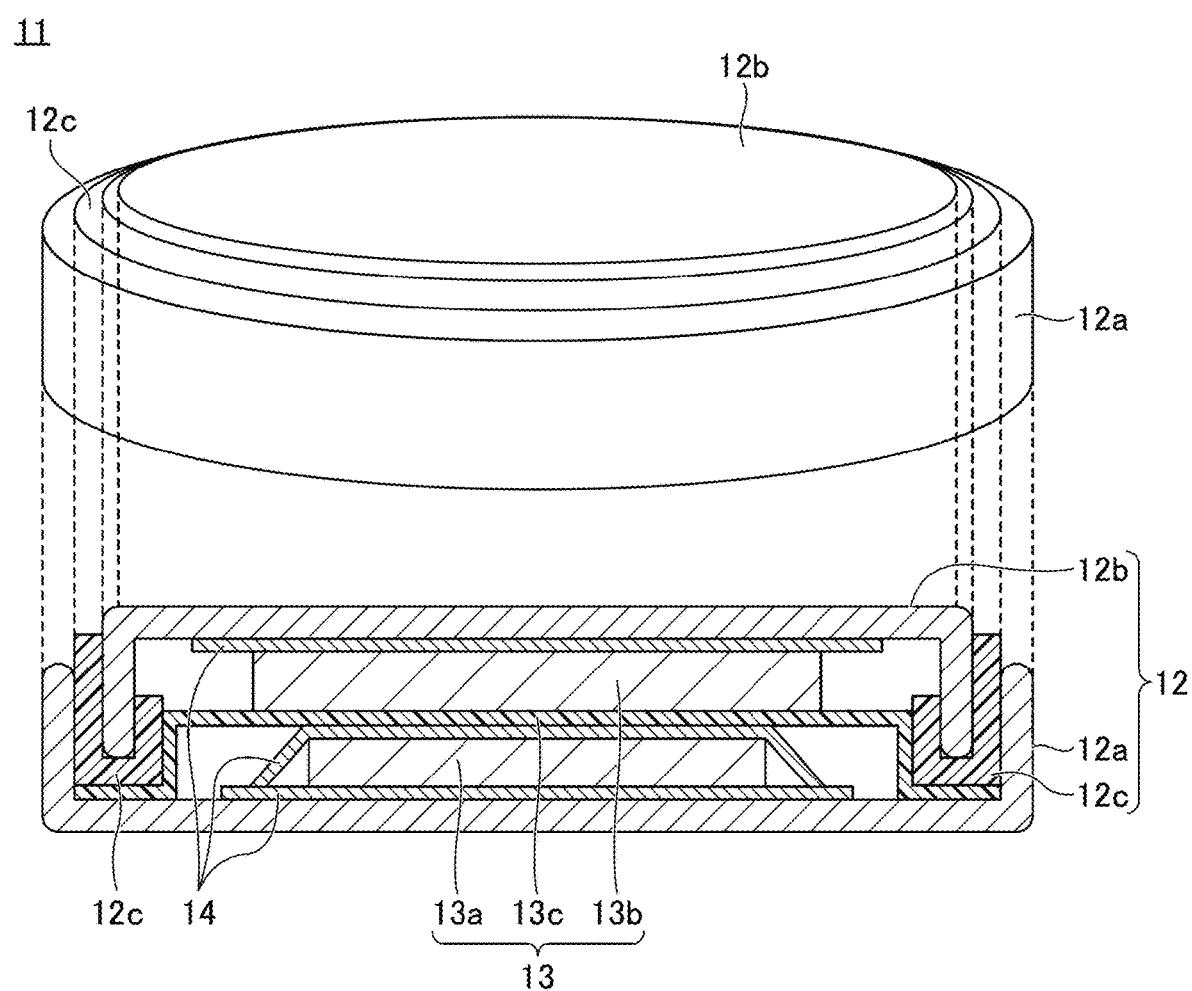
FIG. 4 is an explanatory view illustrating a cross-sectional structure of a coin-type battery prepared in Examples and Comparative Examples.

As illustrated in FIG. 4, the coin-type battery 11 is configured by a case 12 and an electrode 13 contained within the case 12.

The case 12 has a positive electrode can 12a that is hollowed out and has one end open and a negative electrode can 12b that is disposed at the opening of the positive electrode can 12a. When the negative electrode can 12b is disposed at the opening of the positive electrode can 12a, a space to accommodate the electrode 13 is formed between the negative electrode can 12b and the positive electrode can 12a.

The electrode 13 includes of a positive electrode 13a, a separator 13c, and a negative electrode 13b and is laminated in this order. The electrode 13a is housed in the case 12 so that the positive electrode 13a contacts the inner surface of the positive electrode can 12a via a conductor 14, and the negative electrode 13b contacts the inner surface of the negative electrode can 12b via the conductor 14. The conductor 14 is also disposed between the positive electrode 13a and the separator 13c.

The case 12 includes a gasket 12c, which fixes relative movement of the positive electrode can 12a and the negative electrode can 12b so as to maintain the non-contact between the positive electrode can 12a and the negative electrode can 12b. In addition, the gasket 12c also has a function of sealing the gap between the positive electrode can 12a and the negative electrode can 12b to air-tight and liquid-tight the space between the inside of the case 12 and the outside of the case.

The coin-type battery 11 illustrated in FIG. 4 was prepared as follows.

First, 52.5 mg of the positive electrode active material for the lithium ion secondary batteries, as prepared in each Example and Comparative Example, 15 mg of acetylene black, and 7.5 mg of polytetrafluoroethylene (PTFE) resin were mixed, and the resulting positive electrode mixture was made film-thin with a diameter of 11 mm and a thickness of 100 μm to prepare the positive electrode 13a. The prepared positive electrode 13a was dried in a vacuum dryer at 120° C. for 12 hours.

The coin-type battery 11 was prepared in a glove box under an Ar atmosphere controlled at dew point of −80° C., with use of the positive electrode 13a, the negative electrode 13b, the separator 13c, and the electrolyte solution.

For the negative electrode 13b, a negative electrode sheet of graphite powder with average particle size of about 20 μm and polyvinylidene fluoride coated on a copper foil was punched out into a disk having a diameter of 14 mm was used.

A polyethylene porous membrane with a thickness of 25 μm was used as the separator 13c. For the electrolyte solution, a mixture of equal volumes of ethylene carbonate (EC) and diethyl carbonate (DEC) using 1M of $LiClO_4$ as the supporting electrolyte (manufactured by Toyama Chemical Co., Ltd.) was used.

(b) Evaluation

Initial discharge capacity, positive electrode resistance, and cycle characteristics that indicate the performance of the manufactured coin-type battery 11 were evaluated as follows.

(b1) Initial Discharge Capacity

The initial discharge capacity was determined such that the produced coin-type battery was left for about 24 hours. After an open-circuit voltage (OCV) was stabilized, the battery was charged to a cut-off voltage of 4.3 V with a current density of 0.1 $mA/cm^2$ with respect to the positive electrode. After a pause of one hour, the capacity when discharged to a cut-off voltage of 3.0 V was determined as the initial discharge capacity.

(b2) Positive Electrode Resistance

Figure 5A:
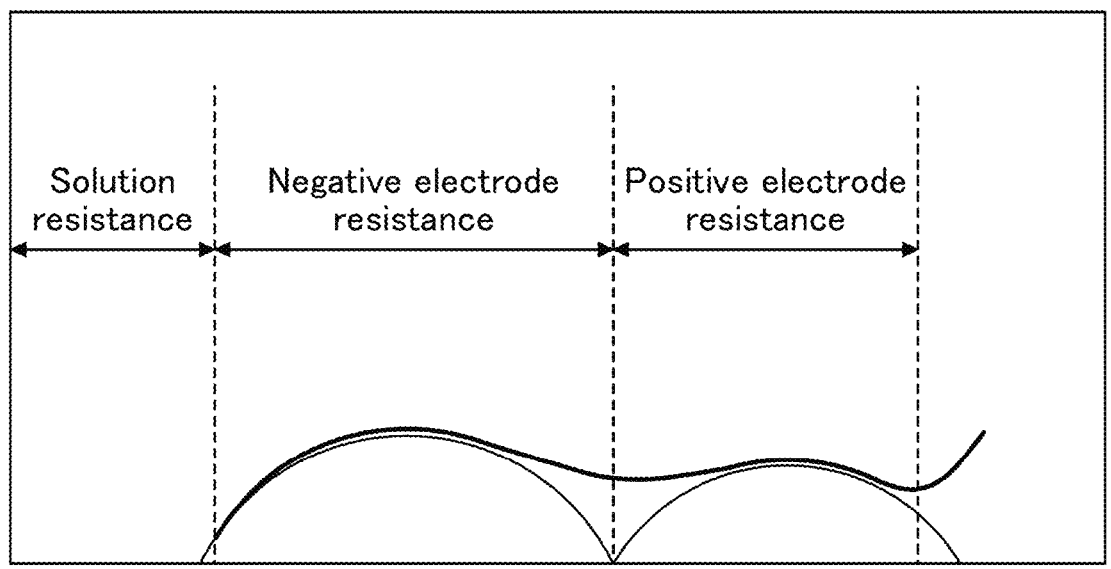
FIG. 5A is a measurement example of an impedance evaluation.

The positive electrode resistance is measured using a frequency response analyzer and potentiogalvanostat (Manufactured by Solatron, 1255B) to charge the coin-type battery 11 at a charge potential of 4.1 V to obtain the Nyquist plot illustrated in FIG. 5A.

The Nyquist plot is expressed as the sum of the characteristic curves indicating the solution resistance, the negative electrode resistance and its capacitance, and the positive electrode resistance and its capacitance.

The battery reaction in the electrode consists of a resistive component of charge transfer and a capacitive component of an electric bilayer. When these are represented by an electric circuit, it represents a parallel circuit of resistance and capacity. As an entire battery, it represents as an equivalent circuit in which a solution resistance, a negative electrode, and a parallel circuit of the positive electrode are connected in series.

Figure 5B:
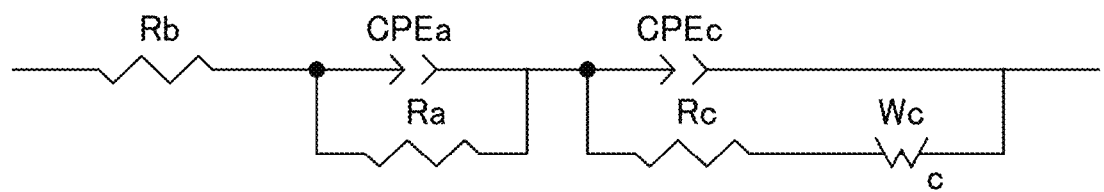
FIG. 5B is a schematic illustration of an equivalent circuit used for analysis.

Therefore, the fitting calculation was performed using the equivalent circuit illustrated in FIG. 5B based on the Nyquist plot illustrated in FIG. 5A, and the value of the positive electrode resistance was calculated. Table 1 indicates the results of the positive electrode resistance before the cycle.

(b3) Cycle Characteristics

Cycle characteristics were evaluated by volume maintenance rate after cycle testing. The cycle testing was paused for 10 minutes after the initial discharge capacitance measurement, and the charge-discharge cycle was repeated for 500 cycles (charge-discharge) as well as the initial discharge capacity measurement. The discharge capacity of 500th cycle was measured and the percentage of the discharge capacity of 500th cycle relative to the discharge capacity of first cycle was calculated as the capacity maintenance rate (%).

(b4) Carbon Content

The carbon content was measured by a carbon sulfur analyzer (model number: CS-600, manufactured by LECO).

In the present embodiment, each sample of the special grade reagent manufactured by Wako Pure Chemical Industries, Ltd. was used for the preparation of the positive electrode active material and the secondary battery, unless otherwise specified.

Example 1

The positive electrode active material and the lithium ion secondary battery were manufactured and evaluated according to the following procedures.

(Mixing Step)

The powder of lithium-nickel composite oxide which is a layered compound and represented by $Li_{0.98}Ni_{0.91}Co_{0.06}Al_{0.03}O_2$ obtained by known techniques using an oxide having Ni as the main component and a lithium hydroxide, was used as a base material. In the following other examples and comparative examples, the lithium-nickel composite oxide of the layered compound is used as the base material. Then, water was added to the base material, and the water content, which was the proportion of the water occupied in the lithium-nickel composite oxide and the starting material used in the mixing step (hereinafter, simply referred to as "water content"), was set to 3.2% by mass.

The base material with added water was charged to a paddle-type mixing device, and tungsten oxide ($WO_3$) was charged to the base material so that the ratio of the number of W atom to the total number of Ni, Co, and Al atoms of the base material was 0.12 at. %, and these starting materials were mixed at 60° C. for 30 minutes to prepare the tungsten mixture.

During the mixing step, decarboxylated air was supplied while exhausting the atmosphere gas inside of the mixing apparatus. Specifically, the atmosphere gas was exhausted at a rate of 0.20 $m^3$/minute with respect to a rate of inputting the water-added base material of 1 kg/minute, and decarboxylated air was supplied at the same flow speed. Thereby, the atmosphere inside the mixing apparatus was controlled so as not to become negative pressure.

The ratio of the number of W atom to the total number of Ni and element M atoms of the base material in the starting material is described as "amount of W" in Table 1.

(Heat Treatment Step)

Thereafter, heat treatment was performed at 190° C. for 120 minutes using a steam tube-type dryer, and then cooled in a furnace.

The atmosphere in the mixing step and the heat treatment step was decarboxylated air.

Finally, the tungsten mixture was crushed and passed through a sieve having a mesh size of 38 μm to obtain a positive electrode active material having particles of a tungsten and lithium containing compound on the surface of the primary particles of the lithium-nickel composite oxide.

For the obtained positive electrode active material, the proportion of segregated particles was calculated.

For the obtained positive electrode active material, the amount of tungsten, which is the ratio of the number of W atom to the total number of Ni, Co, and Al atoms, was evaluated by ICP. As a result, it was confirmed that the amount of tungsten of the obtained positive electrode active material is equal to the above-described amount of W, which is the ratio of the number of W atom to the total number of Ni, Co, and Al atoms of the base material in the starting material provided in the mixing step.

In the following other embodiments and comparative examples, it was also confirmed that the amount of tungsten of the obtained positive electrode active material, which is the ratio of the number of W atom to the total number of Ni and element M atoms, is equal to the ratio of the number of W atom (amount of W) to the total number of Ni and element M atoms in the base material in the starting material.

It should be noted that the tungsten contained in the obtained positive electrode active material is derived from the tungsten and lithium containing compound disposed on the particle surface of the lithium-nickel composite oxide, and the nickel and element M are derived from the lithium-nickel composite oxide. Thus, the amount of tungsten in the positive electrode active material corresponds to the ratio of the number of tungsten atoms in the tungsten and lithium containing compound to the total number of nickel and element M atoms in the lithium-nickel composite oxide in the positive electrode active material.

The battery characteristics of the coin-type battery 11 illustrated in FIG. 4 having the positive electrode prepared using the resulting positive electrode active material were evaluated. The positive electrode resistance before the cycle test (positive electrode resistance before the cycle) was evaluated by using a relative value of 1.00 based on Example 1.

The carbon content was also determined by the method described above.

The test conditions and evaluation results are indicated in Table 1.

Example 2

The positive electrode active material and the secondary battery were manufactured and evaluated in the same manner as Example 1, except that the water content was 3.4% by mass and the temperature at the time of mixing was 55° C.

The test conditions and evaluation results are indicated in Table 1.

Example 3

$WO_3$ was added so that the water content was 5.7% by mass and the ratio of the number of W atom to the total number of Ni, Co, and Al atoms of the base material was 0.24 at. %. The mixing temperature was 50° C., the temperature of the heat treatment was 150° C., and the heat treatment time was 180 minutes. Except for the above points, the positive electrode active material and the secondary battery were manufactured and evaluated in the same manner as Example 1.

The test conditions and evaluation results are indicated in Table 1.

Example 4

The composition of the base material was $Li_{0.97}Ni_{0.91}Co_{0.04}Al_{0.05}O_2$, the water content was 6.9% by mass, and $WO_3$ was added so that the ratio of the number of W atom to the total number of Co, and Al atoms of the base material was 0.06 at. %. During the mixing step, decarboxylated air was supplied while exhausting the atmosphere gas inside of the mixing apparatus. Specifically, the atmosphere gas was exhausted at a rate of 0.15 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 5

The composition of the base material was $Li_{0.97}Ni_{0.91}Co_{0.04}Al_{0.05}O_2$, the water content was 4.1% by mass, and $WO_3$ was added so that the ratio of the number of W atom to the total number of Ni, Co, and Al atoms of the base material was 0.27 at. %. During the mixing step, decarboxylated air was supplied while exhausting the atmosphere gas inside of the mixing apparatus. Specifically, the atmosphere gas was exhausted at a rate of 0.15 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 6

The composition of the base material was $Li_{0.97}Ni_{0.91}Co_{0.04}Al_{0.05}O_2$, the water content was 5.5% by mass, and $WO_3$ was added so that the ratio of the number of W atom to the total number of Ni, Co, and Al atoms of the base material was 0.15 at. %. The temperature during mixing was set to 45° C., and the mixing time was set to 45 minutes. During the mixing step, decarboxylated air was supplied while exhausting the atmosphere gas inside of the mixing apparatus. Specifically, the atmosphere gas was exhausted at a rate of 0.25 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 7

The composition of the base material was $Li_{0.97}Ni_{0.91}Co_{0.04}Al_{0.05}O_2$, the water content was 4.9% by mass, and $WO_3$ was added so that the ratio of the number of W atom to the total number of Ni, Co, and Al atoms of the base material was 0.18 at. %. The temperature during mixing was set to 30° C., the mixing time was set to 60 minutes, the temperature of heat treatment was 175° C., and the heat treatment time was 150 minutes. During the mixing step, decarboxylated air was supplied while exhausting the atmosphere gas inside of the mixing apparatus. Specifically, the atmosphere gas was exhausted at a rate of 0.30 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 8

The composition of the base material was $Li_{0.98}Ni_{0.88}Co_{0.09}Al_{0.03}O_2$, the water content was 4.3% by mass, and WO$_3$ was added so that the ratio of the number of W atom to the total number of Ni, Co, and Al atoms of the base material was 0.18 at. %. Except for the above points, the positive electrode active material and the secondary battery were manufactured and evaluated in the same manner as Example 1.

The test conditions and evaluation results are indicated in Table 1.

Example 9

The composition of the base material was Li$_{0.98}$Ni$_{0.88}$Co$_{0.09}$Al$_{0.03}$O$_2$, the water content was 3.6% by mass, and WO$_3$ was added so that the ratio of the number of W atom to the total number of Ni, Co, and Al atoms of the base material was 0.30 at. %. Except for the above points, the positive electrode active material and the secondary battery were manufactured and evaluated in the same manner as Example 1.

The test conditions and evaluation results are indicated in Table 1.

Example 10

The composition of the base material was Li$_{0.97}$Ni$_{0.88}$Co$_{0.07}$Al$_{0.05}$O$_2$, the water content was 6.4% by mass, and WO$_3$ was added so that the ratio of the number of W atoms to the total number of Ni, Co, and Al atoms of the base material was 0.15 at. %. Except for the above points, the positive electrode active material and the secondary battery were manufactured and evaluated in the same manner as Example 1.

The test conditions and evaluation results are indicated in Table 1.

Example 11

The composition of the base material was Li$_{0.97}$Ni$_{0.88}$Co$_{0.07}$Al$_{0.05}$O$_2$, the water content was 5.8% by mass, and WO$_3$ was added so that the ratio of the number of W atom to the total number of Ni, Co, and Al atoms of the base material was 0.30 at. %. During the mixing step, decarboxylated air was supplied while exhausting the atmosphere gas inside of the mixing apparatus. Specifically, the atmosphere gas was exhausted at a rate of 0.15 m$^3$/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 12

The composition of the base material was Li$_{0.97}$Ni$_{0.91}$Co$_{0.04}$Al$_{0.05}$O$_2$, the water content was 8.6% by mass, and WO$_3$ was added so that the ratio of the number of W atom to the total number of Ni, Co, and Al atoms of the base material was 0.18 at. %. Except for the above points, the positive electrode active material and the secondary battery were manufactured and evaluated in the same manner as Example 1.

The test conditions and evaluation results are indicated in Table 1.

Example 13

The composition of the base material was Li$_{0.98}$Ni$_{0.88}$Co$_{0.09}$Al$_{0.03}$O$_2$, the water content was 7.9% by mass, and WO$_3$ was added so that the ratio of the number of W atoms to the total number of Ni, Co, and Al atoms of the base material was 0.15 at. %. Except for the above points, the positive electrode active material and the secondary battery were manufactured and evaluated in the same manner as Example 1.

The test conditions and evaluation results are indicated in Table 1.

Example 14

The water-added base material and WO$_3$ were continuously charged into a continuous paddle-type mixer, the mixture was continuously fed from the continuous paddle-type mixer to a continuous steam-type dryer, and the dried mixture was continuously drained from the continuous steam dryer. That is, the mixing step and the heat treatment step were continuously performed. Except for the above points, the positive electrode active material and the secondary battery were manufactured and evaluated in the same manner as Example 1.

The test conditions and evaluation results are indicated in Table 1.

Example 15

The water-added base material and NO$_3$ were continuously charged into a continuous paddle-type mixer, the mixture was continuously fed from the continuous paddle-type mixer to a continuous steam-type dryer, and the dried mixture was continuously drained from the continuous steam dryer. That is, the mixing step and the heat treatment step were continuously performed. Except for the above points, the positive electrode active material and the secondary battery were manufactured and evaluated in the same manner as Example 5.

The test conditions and evaluation results are indicated in Table 1.

Example 16

The positive electrode active material and the secondary battery were manufactured and evaluated in the same manner as Example 1, except that the composition of the base material was Li$_{0.98}$Ni$_{0.55}$Co$_{0.20}$Mn$_{0.25}$O$_2$.

The test conditions and evaluation results are indicated in Table 1.

Example 17

The positive electrode active material and the secondary battery were manufactured and evaluated in the same manner as Example 16 except that the water content was 4.9% by mass, WO$_3$ was added so that the ratio of the number of W atoms to the total number of Ni, Co, and Mn atoms of the base material was 0.18 at. %, and the temperature during mixing was 55° C.

The test conditions and evaluation results are indicated in Table 1.

Example 18

The composition of the base material was $Li_{0.97}Ni_{0.91}Co_{0.04}Al_{0.05}O_2$, the water content was 5.2% by mass, and $WO_3$ was added so that the ratio of the number of W atom to the total number of Ni, Co, and Al atoms of the base material was 0.15 at. %. During the mixing step, decarboxylated air was supplied while exhausting the atmosphere gas inside of the mixing apparatus. Specifically, the atmosphere gas was exhausted at a rate of 0.10 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 19

The composition of the base material was $Li_{0.97}Ni_{0.91}Co_{0.04}Al_{0.05}O_2$, the water content was 5.5% by mass, and $WO_3$ was added so that the ratio of the number of W atoms to the total number of Ni, Co, and Al atoms of the base material was 0.19 at. %. During the mixing step, decarboxylated air was supplied while exhausting the atmosphere gas inside of the mixing apparatus. Specifically, the atmosphere gas was exhausted at a rate of 0.35 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 20

The composition of the base material was $Li_{0.97}Ni_{0.88}Co_{0.07}Al_{0.05}O_2$, the water content was 4.9% by mass, and $WO_3$ was added so that the ratio of the number of W atoms to the total number of Ni, Co, and Al atoms of the base material was 0.18 at. %. During the mixing step, decarboxylated air was supplied while exhausting the atmosphere gas inside of the mixing apparatus. Specifically, the atmosphere gas was exhausted at a rate of 0.10 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

Example 21

The composition of the base material was $Li_{0.97}Ni_{0.88}Co_{0.07}Al_{0.05}O_2$, the water content was 5.3% by mass, and $WO_3$ was added so that the ratio of the number of W atoms to the total number of Ni, Co, and Al atoms of the base material was 0.18 at. %. During the mixing step, decarboxylated air was supplied while exhausting the atmosphere gas inside of the mixing apparatus. Specifically, the atmosphere gas was exhausted at a rate of 0.35 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

Example 22

The composition of the base material was $Li_{0.98}Ni_{0.55}Co_{0.20}Mn_{0.25}O_2$, the water content was 5.3% by mass, and $WO_3$ was added so that the ratio of the number of W atom to the total number of Ni, Co, and Al atoms of the base material was 0.19 at. %. During the mixing step, decarboxylated air was supplied while exhausting the atmosphere gas inside of the mixing apparatus. Specifically, the atmosphere gas was exhausted at a rate of 0.10 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Example 23

The composition of the base material was $Li_{0.98}Ni_{0.55}Co_{0.20}Mn_{0.25}O_2$ the water content was 4.8% by mass, and $WO_3$ was added so that the ratio of the number of W atom to the total number of Ni, Co, and Al atoms of the base material was 0.17 at. %. During the mixing step, decarboxylated air was supplied while exhausting the atmosphere gas inside of the mixing apparatus. Specifically, the atmosphere gas was exhausted at a rate of 0.35 m³/minute with respect to a rate of inputting the water-added base material of 1 kg/minute, and decarboxylated air was supplied at the same flow speed. Thereby, the atmosphere inside the mixing apparatus was controlled so as not to become negative pressure. Except for the above points, the positive electrode active material and the secondary battery were manufactured and evaluated in the same manner as Example 1.

The test conditions and evaluation results are indicated in Table 1.

Comparative Example 1

The composition of the base material was $Li_{0.97}Ni_{0.91}Co_{0.04}Al_{0.05}O_2$, the water content was 5.2% by mass, and $WO_3$ was added so that the ratio of the number of W atoms to the total number of Ni, Co, and Al atoms of the base material was 0.03 at. %. Except for the above points, the positive electrode active material and the secondary battery were manufactured and evaluated in the same manner as Example 1.

The test conditions and evaluation results are indicated in Table 1.

Comparative Example 2

The water content was 2.7% by mass, and $WO_3$ was added so that the ratio of the number of W atom to the total number of Ni, Co, and Al atoms of the base material was 0.15 at. %. Except for the above points, the positive electrode active material and the secondary battery were manufactured and evaluated in the same manner as Example 1.

The test conditions and evaluation results are indicated in Table 1.

Comparative Example 3

The composition of the base material was $Li_{0.97}Ni_{0.88}Co_{0.07}Al_{0.05}O_2$, the water content was 2.8% by mass, and $WO_3$ was added so that the ratio of the number of W atoms to the total number of Ni, Co, and Al atoms of the base material was 0.15 at. %. Except for the above points, the positive electrode active material and the secondary battery were manufactured and evaluated in the same manner as Example 1.

The test conditions and evaluation results are indicated in Table 1.

Comparative Example 4

The composition of the base material was $Li_{0.98}Ni_{0.91}Co_{0.06}Al_{0.03}O_2$, the water content was 4.5% by mass, and $NO_3$ was added so that the ratio of the number of W atoms to the total number of Ni, Co, and Al atoms of the base material was 0.18 at. %. The temperature during mixing was 25° C., and the mixing time was 90 minutes. Except for the above points, the positive electrode active material and the secondary battery were manufactured and evaluated in the same manner as Example 1.

The test conditions and evaluation results are indicated in Table 1.

Comparative Example 5

The composition of the base material was $Li_{0.98}Ni_{0.91}Co_{0.06}Al_{0.03}O_2$, the water content was 4.4% by mass, and the ratio of the number of W atoms to the total number of Ni, Co, and Al atoms of the base material was 0.15 at. %. The temperature during mixing was 70° C., and the mixing time was 30 minutes. Except for the above points, the positive electrode active material and the secondary battery were manufactured and evaluated in the same manner as Example 1.

The test conditions and evaluation results are indicated in Table 1.

Comparative Example 6

The composition of the base material was $Li_{0.98}Ni_{0.88}Co_{0.09}Al_{0.03}O_2$, the water content was 4.5% by mass, and the ratio of the number of W atoms to the total number of Ni, Co, and Al atoms of the base material was 0.18 at. %. The temperature during mixing was 70° C., and the mixing time was 30 minutes. Except for the above points, the positive electrode active material and the secondary battery were manufactured and evaluated in the same manner as Example 1.

The test conditions and evaluation results are indicated in Table 1.

Comparative Example 7

The composition of the base material was $Li_{0.97}Ni_{0.88}Co_{0.07}Al_{0.05}O_2$, the water content was 4.2% by mass, and the ratio of the number of W atoms to the total number of Ni, Co, and Al atoms of the base material was 0.18 at. %. The temperature during mixing was 75° C., and the mixing time was 30 minutes. Except for the above points, the positive electrode active material and the secondary battery were manufactured and evaluated in the same manner as Example 1.

The test conditions and evaluation results are indicated in Table 1.

Comparative Example 8

The water content was 3.4% by mass, the ratio of the number of W atoms to the total number of Ni, Co, and Mn atoms of the base material was 0.13 at. %, and the temperature during mixing was 70° C. Except for the above points, the positive electrode active material and the secondary battery were manufactured and evaluated in the same manner as Example 16.

The test conditions and evaluation results are indicated in Table 1.

Comparative Example 9

The water content was 3.9% by mass, the ratio of the number of W atoms to the total number of Ni, Co, and Mn atoms of the base material was 0.14 at. %, the temperature during mixing was 25° C., and the mixing time was 90 minutes. Except for the above points, the positive electrode active material and the secondary battery were manufactured and evaluated in the same manner as Example 16.

The test conditions and evaluation results are indicated in Table 1.

TABLE 1

|  | Composition | Water content [% by mass] | Tungsten compound | Amount of W [at. %] | Temp. [° C.] | Time [min.] | Atmosphere | Exhaust flow rate to a rate of inputting base material of 1 kg/min [m³/min] |
|---|---|---|---|---|---|---|---|---|
| Example 1 | $Li_{0.98}Ni_{0.91}Co_{0.06}Al_{0.03}O_2$ | 3.2 | $WO_3$ | 0.12 | 60 | 30 | Decarboxylated air | 0.20 |
| Example 2 | $Li_{0.98}Ni_{0.91}Co_{0.06}Al_{0.03}O_2$ | 3.4 | $WO_3$ | 0.12 | 55 | 30 |  | 0.20 |
| Example 3 | $Li_{0.98}Ni_{0.91}Co_{0.06}Al_{0.03}O_2$ | 5.7 | $WO_3$ | 0.24 | 50 | 30 |  | 0.20 |
| Example 4 | $Li_{0.97}Ni_{0.91}Co_{0.04}Al_{0.05}O_2$ | 6.9 | $WO_3$ | 0.06 | 60 | 30 |  | 0.15 |
| Example 5 | $Li_{0.97}Ni_{0.91}Co_{0.04}Al_{0.05}O_2$ | 4.1 | $WO_3$ | 0.27 | 60 | 30 |  | 0.15 |
| Example 6 | $Li_{0.97}Ni_{0.91}Co_{0.04}Al_{0.05}O_2$ | 5.5 | $WO_3$ | 0.15 | 45 | 45 |  | 0.25 |
| Example 7 | $Li_{0.97}Ni_{0.91}Co_{0.04}Al_{0.05}O_2$ | 4.9 | $WO_3$ | 0.18 | 30 | 60 |  | 0.30 |
| Example 8 | $Li_{0.98}Ni_{0.88}Co_{0.09}Al_{0.03}O_2$ | 4.3 | $WO_3$ | 0.18 | 60 | 30 |  | 0.20 |
| Example 9 | $Li_{0.98}Ni_{0.88}Co_{0.09}Al_{0.03}O_2$ | 3.6 | $WO_3$ | 0.30 | 60 | 30 |  | 0.20 |

TABLE 1-continued

| | Composition | | | | | | |
|---|---|---|---|---|---|---|---|
| Example 10 | $Li_{0.97}Ni_{0.88}Co_{0.07}Al_{0.05}O_2$ | 6.4 | $WO_3$ | 0.15 | 60 | 30 | 0.20 |
| Example 11 | $Li_{0.97}Ni_{0.88}Co_{0.07}Al_{0.05}O_2$ | 5.8 | $WO_3$ | 0.30 | 60 | 30 | 0.15 |
| Example 12 | $Li_{0.97}Ni_{0.91}Co_{0.04}Al_{0.05}O_2$ | 8.6 | $WO_3$ | 0.18 | 60 | 30 | 0.20 |
| Example 13 | $Li_{0.98}Ni_{0.88}Co_{0.09}Al_{0.03}O_2$ | 7.9 | $WO_3$ | 0.15 | 60 | 30 | 0.20 |
| Example 14 | $Li_{0.98}Ni_{0.91}Co_{0.06}Al_{0.03}O_2$ | 3.2 | $WO_3$ | 0.12 | 60 | 30 | 0.20 |
| Example 15 | $Li_{0.97}Ni_{0.91}Co_{0.04}Al_{0.05}O_2$ | 4.1 | $WO_3$ | 0.27 | 60 | 30 | 0.15 |
| Example 16 | $Li_{0.98}Ni_{0.55}Co_{0.20}Mn_{0.25}O_2$ | 3.2 | $WO_3$ | 0.12 | 60 | 30 | 0.20 |
| Example 17 | $Li_{0.98}Ni_{0.55}Co_{0.20}Mn_{0.25}O_2$ | 4.9 | $WO_3$ | 0.18 | 55 | 30 | 0.20 |
| Example 18 | $Li_{0.97}Ni_{0.91}Co_{0.04}Al_{0.05}O_2$ | 5.2 | $WO_3$ | 0.15 | 60 | 30 | 0.10 |
| Example 19 | $Li_{0.97}Ni_{0.91}Co_{0.04}Al_{0.05}O_2$ | 5.5 | $WO_3$ | 0.19 | 60 | 30 | 0.35 |
| Example 20 | $Li_{0.97}Ni_{0.88}Co_{0.07}Al_{0.05}O_2$ | 4.9 | $WO_3$ | 0.18 | 60 | 30 | 0.10 |
| Example 21 | $Li_{0.97}Ni_{0.88}Co_{0.07}Al_{0.05}O_2$ | 5.3 | $WO_3$ | 0.18 | 60 | 30 | 0.35 |
| Example 22 | $Li_{0.98}Ni_{0.55}Co_{0.20}Mn_{0.25}O_2$ | 5.3 | $WO_3$ | 0.19 | 60 | 30 | 0.10 |
| Example 23 | $Li_{0.98}Ni_{0.55}Co_{0.20}Mn_{0.25}O_2$ | 4.8 | $WO_3$ | 0.17 | 60 | 30 | 0.35 |
| Comparative Example 1 | $Li_{0.97}Ni_{0.91}Co_{0.04}Al_{0.05}O_2$ | 5.2 | $WO_3$ | 0.03 | 60 | 30 | 0.20 |
| Comparative Example 2 | $Li_{0.98}Ni_{0.91}Co_{0.06}Al_{0.03}O_2$ | 2.7 | $WO_3$ | 0.15 | 60 | 30 | 0.20 |
| Comparative Example 3 | $Li_{0.97}Ni_{0.88}Co_{0.07}Al_{0.05}O_2$ | 2.8 | $WO_3$ | 0.15 | 60 | 30 | 0.20 |
| Comparative Example 4 | $Li_{0.98}Ni_{0.91}Co_{0.06}Al_{0.03}O_2$ | 4.5 | $WO_3$ | 0.18 | 25 | 90 | 0.20 |
| Comparative Example 5 | $Li_{0.96}Ni_{0.91}Co_{0.06}Al_{0.03}O_2$ | 4.4 | $WO_3$ | 0.15 | 70 | 30 | 0.20 |
| Comparative Example 6 | $Li_{0.98}Ni_{0.88}Co_{0.09}Al_{0.03}O_2$ | 4.5 | $WO_3$ | 0.18 | 70 | 30 | 0.20 |
| Comparative Example 7 | $Li_{0.97}Ni_{0.88}Co_{0.07}Al_{0.05}O_2$ | 4.2 | $WO_3$ | 0.18 | 75 | 30 | 0.20 |
| Comparative Example 8 | $Li_{0.96}Ni_{0.55}Co_{0.20}Mn_{0.25}O_2$ | 3.4 | $WO_3$ | 0.13 | 70 | 30 | 0.20 |
| Comparative Example 9 | $Li_{0.96}Ni_{0.55}Co_{0.20}Mn_{0.25}O_2$ | 3.9 | $WO_3$ | 0.14 | 25 | 90 | 0.20 |

| | Conditions of heat-treating | | | Evaluation results | | | | |
|---|---|---|---|---|---|---|---|---|
| | Temp, [° C.] | Time [min.] | Atmosphere | Carbon content (% by mass) | Proportion of segregated particles (%) | Initial discharge capacity [mAh/g] | Capacity maintenance rate [%] | Positive electrode resistance before cycle |
| Example 1 | 190 | 120 | Decarboxylated air | 0.03 | 0.087 | 214 | 81 | 1.00 |
| Example 2 | 190 | 120 | | 0.03 | 0.062 | 214 | 80 | 1.01 |
| Example 3 | 150 | 180 | | 0.03 | 0.008 | 219 | 85 | 0.95 |
| Example 4 | 190 | 120 | | 0.04 | 0.031 | 213 | 81 | 1.03 |
| Example 5 | 190 | 120 | | 0.03 | 0.005 | 216 | 87 | 0.96 |
| Example 6 | 190 | 120 | | 0.02 | 0.009 | 218 | 86 | 0.97 |
| Example 7 | 175 | 150 | | 0.02 | 0.005 | 217 | 87 | 0.98 |
| Example 8 | 190 | 120 | | 0.03 | 0.003 | 213 | 88 | 0.97 |
| Example 9 | 190 | 120 | | 0.03 | 0.054 | 210 | 83 | 0.99 |
| Example 10 | 190 | 120 | | 0.03 | 0.024 | 212 | 84 | 0.98 |
| Example 11 | 190 | 120 | | 0.04 | 0.009 | 214 | 85 | 0.96 |
| Example 12 | 190 | 120 | | 0.03 | 0.063 | 213 | 81 | 1.04 |
| Example 13 | 190 | 120 | | 0.03 | 0.049 | 212 | 82 | 0.97 |
| Example 14 | 190 | 120 | | 0.03 | 0.078 | 214 | 80 | 1.01 |
| Example 15 | 190 | 120 | | 0.03 | 0.004 | 215 | 85 | 0.98 |
| Example 16 | 190 | 120 | | 0.03 | 0.089 | 173 | 89 | 0.99 |
| Example 17 | 190 | 120 | | 0.03 | 0.005 | 174 | 88 | 1.00 |
| Example 18 | 190 | 120 | | 0.07 | 0.003 | 218 | 85 | 0.97 |
| Example 19 | 190 | 120 | | 0.01 | 0.061 | 216 | 87 | 1.00 |
| Example 20 | 190 | 120 | | 0.07 | 0.003 | 213 | 85 | 0.98 |
| Example 21 | 190 | 120 | | 0.02 | 0.055 | 213 | 83 | 1.01 |
| Example 22 | 190 | 120 | | 0.06 | 0.004 | 175 | 87 | 0.98 |
| Example 23 | 190 | 120 | | 0.01 | 0.062 | 173 | 87 | 0.99 |
| Comparative Example 1 | 190 | 120 | | 0.03 | 0.001 | 201 | 70 | 4.82 |
| Comparative Example 2 | 190 | 120 | | 0.03 | 0.112 | 205 | 77 | 3.72 |
| Comparative Example 3 | 190 | 120 | | 0.04 | 0.104 | 202 | 76 | 4.70 |
| Comparative Example 4 | 190 | 120 | | 0.03 | 0.219 | 207 | 75 | 1.93 |
| Comparative Example 5 | 190 | 120 | | 0.04 | 0.132 | 206 | 74 | 3.28 |
| Comparative Example 6 | 190 | 120 | | 0.03 | 0.151 | 203 | 74 | 4.49 |
| Comparative Example 7 | 190 | 120 | | 0.03 | 0.183 | 200 | 72 | 5.14 |
| Comparative Example 8 | 190 | 120 | | 0.03 | 0.133 | 169 | 79 | 2.89 |

TABLE 1-continued

| | | | | | | | |
|---|---|---|---|---|---|---|---|
| Comparative Example 9 | 190 | 120 | 0.03 | 0.284 | 171 | 81 | 1.77 |

As apparent from Table 1, the positive electrode active material of Examples 1 to 17 have a higher initial discharge capacity, a lower positive electrode resistance, a higher capacity maintenance rate, a lower proportion of segregated particles, and a battery having excellent characteristics compared to Comparative Examples that correspond in the compositions of the base materials.

In Examples 1, 2, 9, 14, and 16, the water content, which is the proportion of water contained in the starting material and lithium-nickel composite oxide used in the mixing step, was low, such as less than 4.0% by mass. Therefore, the $WO_3$ was not completely dispersed and the unreacted $WO_3$ was likely to remain. Therefore, it is considered that the proportion of segregated particles is slightly higher compared to other embodiments, and the battery characteristics are slightly inferior compared to other embodiments.

In Examples 4, 12, and 13, the water content was significantly higher than 6.0%, thereby lithium in the lithium-nickel composite oxide was eluted into the excess water content. The reaction with the eluted lithium and tungsten occurred at the portion where lithium locally increased, resulting in the formation of segregated particles. Therefore, it is considered that the number of segregated particles is relatively large compared to other embodiments, and the battery characteristics are somewhat inferior compared to other embodiments.

In Examples 6 and 7, a longer mixing time was needed than in the other examples because the temperature was lower during mixing, but the evaluation results were good.

Examples 18, 20 and 22 had a higher carbon content than the other examples, although at a satisfactory level. This is because the exhaust speed and the flow rate of the decarboxylated air were low, and the carbon dioxide concentration in the atmosphere of the mixing step was high, and the carbonation of the lithium component in the lithium-nickel composite oxide was promoted. The carbon dioxide content may become a gas in the battery and deteriorate the characteristics. Therefore, it is preferable that the carbonation is minimized.

In Examples 19, 21, and 23, the exhaust speed and the flow rate of the decarboxylated air were high, so that the carbonation of the lithium component of the lithium-nickel composite oxide was low. However, the drying of the lithium component was accelerated somewhat by the air flow. Therefore, unreacted $WO_3$ was high, although at a satisfactory level.

In contrast, the ratio of the number of W atom to the total number of Ni, Co, and Al atoms of the base material in Comparative Example 1 was below 0.05 at. %. Therefore, the tungsten and lithium containing compound was not sufficiently formed, resulting in the significantly inferior battery characteristics.

In Comparative Examples 2 and 3, the water content was low. Therefore, the $WO_3$ could not be sufficiently dispersed, leaving much unreacted $WO_3$. Thereby, excess lithium components remained, resulting in deterioration the battery characteristics.

In Comparative Examples 4 and 9, the temperature of the mixture was below 30° C. Therefore, the $WO_3$ could not be sufficiently dispersed, leaving much unreacted $WO_3$. Thereby, excess lithium components remained, resulting in deterioration the battery characteristics.

In Comparative Examples 5 to 8, the temperature of the mixture exceeded 65° C., the reduction of the water content from the tungsten mixtures was rapid. Therefore, the water content required for dispersing the $WO_3$ could not be maintained, leaving much unreacted $WO_3$. Thereby, excess lithium components remained, resulting in deterioration the battery characteristics.

In addition, in Comparative Examples 2 to 9, the $WO_3$ could not be sufficiently dispersed as described above. Therefore, it was confirmed that the proportion of segregated particles became high, resulting in deterioration of the battery characteristics.

Thus, it has been found that the positive electrode active material of the present embodiment is low cost but exhibits high capacity and high output. In Examples 14 and 15, the continuous processing was performed, but it was found that the evaluation results were good, the productivity was high, and great cost reduction could be expected.

As described above, the method of manufacturing the positive electrode active material for a lithium ion secondary battery, the positive electrode active material for a lithium ion secondary battery, and the lithium ion secondary battery have been described in the embodiments and the examples, but the present invention is not limited to the above-described embodiments and the examples. Various modifications and variations are possible within the scope of the invention as defined in the claims.

This application is based on and claims priority of Japanese Patent Application No. 2019-029870 filed Feb. 21, 2019, the entire contents of Japanese Patent Application No. 2019-029870 are hereby incorporated by reference.

The invention claimed is:
1. A method of manufacturing a positive electrode active material for a lithium ion secondary battery comprising:
    a mixing step of mixing a lithium-nickel composite oxide, which is a starting material, with a tungsten compound powder without lithium, while being heated, to prepare a tungsten mixture;
    a heat treatment step of heat-treating the tungsten mixture,
    wherein the lithium-nickel composite oxide contains lithium (Li), nickel (Ni), and an element M
    wherein, the element M is at least one element selected from Mn, V, Mg, Mo, Nb, Ti, Co, and Al,
    wherein, in the starting material, a ratio of number of tungsten atom to a total number of nickel and the element M atoms contained in the lithium-nickel composite oxide is 0.05 at. % or more and 3.00 at. % or less,
    wherein a water content, which is a proportion of the water in the starting material and the lithium-nickel composite oxide, is 3.0% by mass or more,
    wherein a temperature of the mixing step is 30° C. or higher and 65° C. or lower, and
    wherein an atmosphere of the mixing step is either a decarboxylated air or an inert gas.
2. The method of manufacturing the positive electrode active material for a lithium ion secondary battery according to claim 1, wherein the lithium-nickel composite oxide is a layered compound containing lithium (Li), nickel (Ni), and an element M in an amount of substance ratio of Li: Ni: M=y: 1-x: x, wherein 0≤x≤0.70, 0.95≤y≤1.20.

3. The method of manufacturing the positive electrode active material for a lithium ion secondary battery according to claim 1, wherein the water content is 3.0% by mass or more and 7.0% by mass or less.

4. The method of manufacturing the positive electrode active material for a lithium ion secondary battery according to claim 1, wherein the water content is 4.0% by mass or more and 6.0% by mass or less.

5. The method of manufacturing the positive electrode active material for a lithium ion secondary battery according to claim 1, wherein a heat treatment temperature of the heat treatment step is 100° C. or higher and 200° C. or lower.

6. The method of manufacturing the positive electrode active material for a lithium ion secondary battery according to claim 1, wherein an atmosphere gas of the mixing step is exhausted at a rate of 0.15 m³/minute or more and 0.30 m³/minute or less with respect to a rate of inputting the lithium-nickel composite oxide of 1 kg/minute into the mixing step, and the decarboxylated air or the inert gas is supplied to the atmosphere of the mixing step to maintain the atmosphere of the mixing under positive pressure.

7. The method of manufacturing the positive electrode active material for a lithium ion secondary battery according to claim 1, wherein an atmosphere of the heat treatment step is either a decarboxylated air or an inert gas.

8. The method of manufacturing the positive electrode active material for a lithium ion secondary battery according to claim 1, wherein the tungsten compound without lithium is one or more elements selected from a tungsten oxide ($WO_3$) and a tungstic acid ($WO_3 \cdot H_2O$).

9. The method of manufacturing the positive electrode active material for a lithium ion secondary battery according to claim 1, wherein a lithium tungstate is fixed to a surface of lithium-nickel oxide composite particles in the heat treatment step.

\* \* \* \* \*